(12) United States Patent
Henrie et al.

(10) Patent No.: US 6,519,144 B1
(45) Date of Patent: Feb. 11, 2003

(54) WALL MOUNT CRADLE FOR PERSONAL DIGITAL ASSISTANTS

(75) Inventors: James B. Henrie, Grayslake, IL (US); R. Brigitte Henrie, Grayslake, IL (US)

(73) Assignee: Palm, Inc., Santa Clara, CA (US)

( * ) Notice: Subject to any disclaimer, the term of this patent is extended or adjusted under 35 U.S.C. 154(b) by 0 days.

(21) Appl. No.: 09/676,151

(22) Filed: Sep. 29, 2000

(51) Int. Cl.$^7$ .............................. G06F 1/16; H05K 5/00
(52) U.S. Cl. ..................... 361/686; 361/683; 710/303
(58) Field of Search .................... 361/686, 680, 361/681, 683; 710/303, 73

(56) References Cited

U.S. PATENT DOCUMENTS

| | | | | | |
|---|---|---|---|---|---|
| 5,497,464 A | * | 3/1996 | Yeh | ........................ | 395/200.01 |
| 5,739,665 A | * | 4/1998 | Bares | ............................ | 320/2 |
| 5,900,875 A | * | 5/1999 | Haitani et al. | ............... | 345/349 |
| 6,018,230 A | * | 1/2000 | Casey | ........................ | 320/114 |
| 6,231,371 B1 | * | 5/2001 | Helot | ......................... | 439/374 |

\* cited by examiner

*Primary Examiner*—Lynn D. Feild
(74) *Attorney, Agent, or Firm*—Wagner, Murabito & Hao LLP

(57) ABSTRACT

An apparatus for enhancing the placement and communication functionality of a palmtop computer. In one embodiment, the present invention has a mountable palmtop computer cradling unit. The palmtop computer cradling unit is adapted to facilitate the electrical and mechanical coupling of a palmtop computer to the palmtop computer cradling unit. In the present embodiment, the mountable apparatus has a surface mounting portion integral of the palmtop computer cradling unit. The surface mounting portion is adapted to provide mounting capabilities of the palmtop computer cradling unit. Furthermore, the mountable apparatus additionally has a communication connector interface portion coupled to the palmtop computer cradling unit. The communication connector interface portion is adapted to provide enhanced communication functionality to a palmtop computer, once the palmtop computer is coupled to the palmtop computer cradling unit.

31 Claims, 44 Drawing Sheets

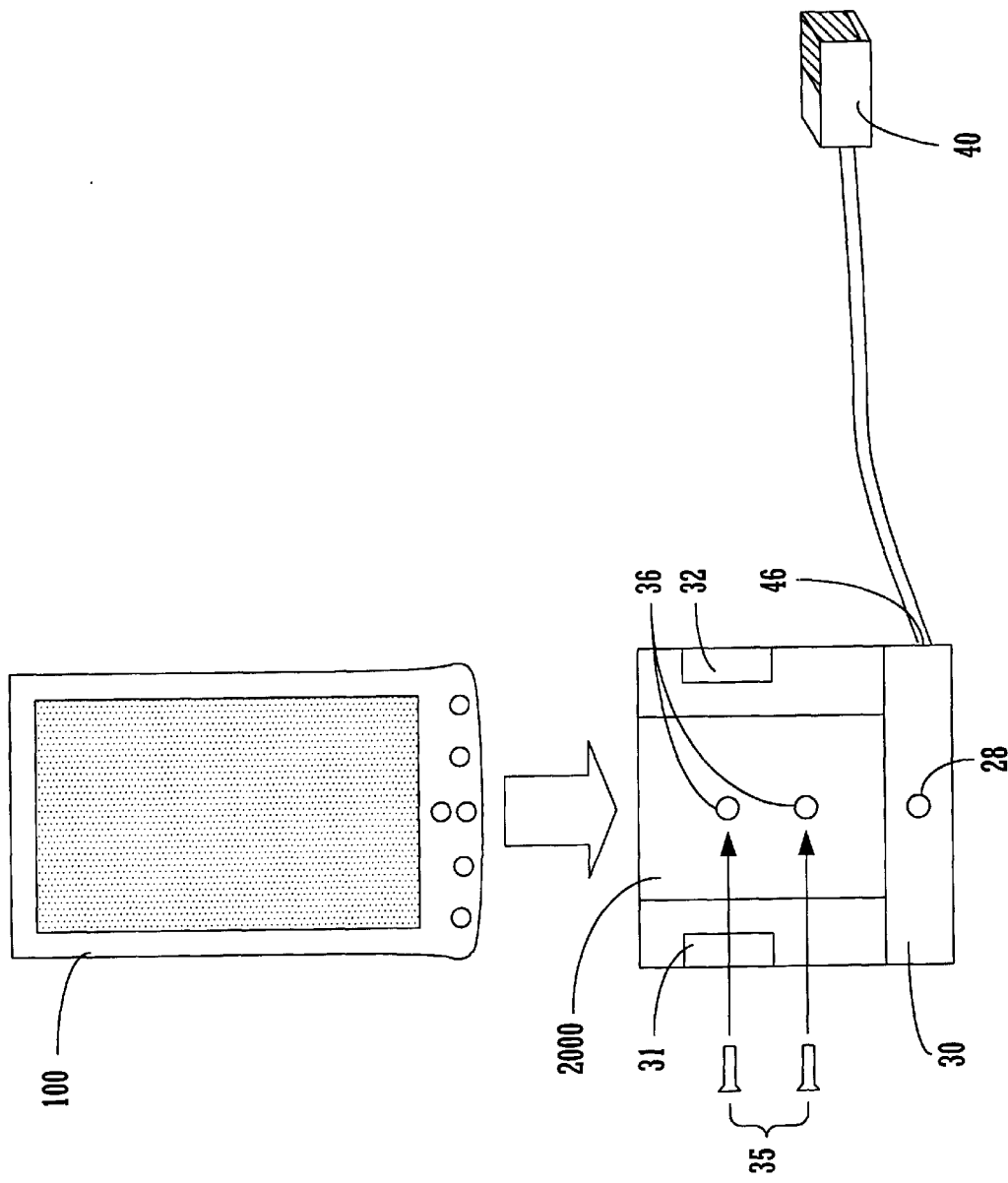

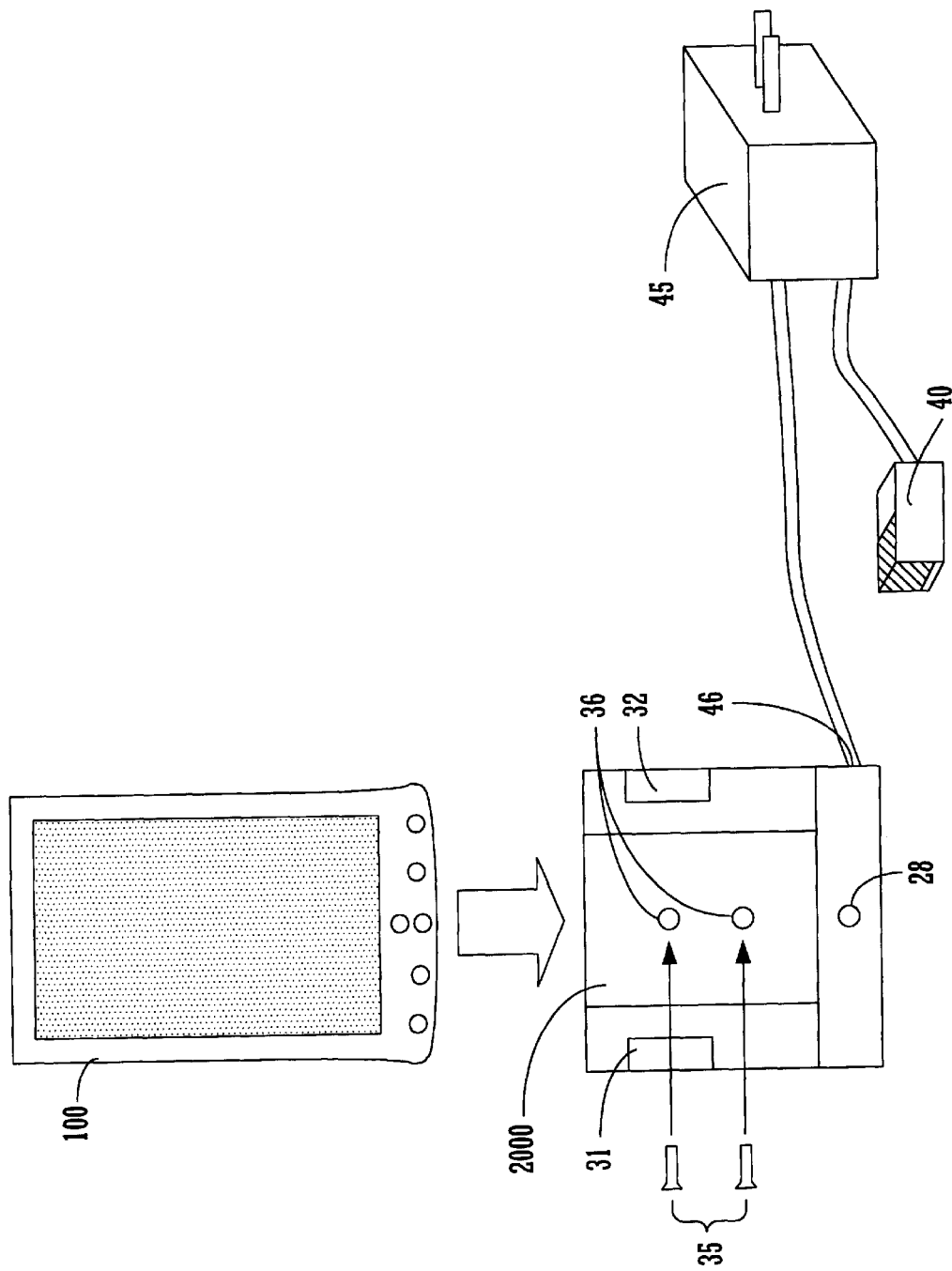

WALL MOUNT CRADLE FOR PERSONAL DIGITAL ASSISTANTS

FIELD OF THE INVENTION

The present invention relates to an apparatus for providing a wall mountable palmtop computer cradling unit. More particularly, the present invention provides this mountability feature while enhancing the communication functionality of a palmtop computer.

BACKGROUND OF THE INVENTION

Advances in technology have further enabled the process of miniaturizing the components required to build computer systems. In direct response to this continuing miniaturization, new categories of computer systems have been developed. One of the newly developed categories of computer systems has been the portable or "palmtop" computer system, usually and commonly referred to as a personal digital assistant or PDA. Examples of other palmtop computer systems include electronic schedulers, electronic address books, electronic day planners and the like. Many corporations have developed and are marketing PDA's.

Because of the continuing miniaturization of computer systems and their related components, users of today's palmtop computer can now carry powerful computers. A palmtop computer system that is sufficiently diminutive to be held in one's hand is considered a "palm-sized" computer, and, as such, are readily carried about in the user's briefcase, purse, and, in many circumstances, in the user's pocket. By virtue of their diminutive size and weight, palmtop computers are, therefore, exceptionally portable.

Because a palmtop computer has a significantly smaller "footprint" than the desktop computer, one advantage of the palmtop computer is its ability to be placed almost anywhere, on almost any horizontal surface, without the required substantial physical space normally associated with personal computers. Another advantage is the ability of the palmtop computer (PDA) to communicate with other computer systems, be they other PDAs, desktop computers, remote computer systems, and the like. The customary methods for a PDA to communicate with other computer systems is via a wireless connection, such as, for example, an IR LAN or a Bluetooth system, or by physically coupling the PDA to the other computer system. This is usually accomplished with the assistance of a palmtop computer cradle, which is designed to provide the wired connection, such as a RS-232 (serial), USB (universal serial bus), or a IEEE 1394 (Firewire) cable, which enables the communication between the palmtop computer and, in this instance, the desktop computer system. The palmtop cradle is usually placed near the host desktop computer, and atop the same surface on which the desktop rests, which, unfortunately, adds to the clutter of wires and devices already placed there. To eliminate some of the clutter surrounding the desktop computer, what is needed is a means for mounting the PDA cradle on a surface other than the horizontally oriented surface on which the desktop computer resides.

As a direct result of the increased computing power of the palmtop computer, many people today are foregoing the purchase of a traditional desktop computer, because of, perhaps, physical size, required space, monetary outlay, and portability considerations, and are opting to acquire a palmtop computer (PDA) as their stand alone computer system. The previously mentioned palmtop computer cradle, in addition to the above stated limitations, is further disadvantaged in that it must be coupled to a host computer that acts as the intermediary device to access the Internet. Another disadvantage that the palmtop computer, and its related diminutive size while being combined with increased computing power, has is that some of the desktop computer features, either those inherent of the desktop computer or those peripherals which can be added to the desktop computer by utilization of the available expansion slots, have had to be eliminated. One component of the palmtop computer that has been routinely omitted is the modem, a common means of wired or wireless communication, creating a distinct disadvantage when attempting to establish communication between the palmtop computer and remote computer: system. What is needed is a means to connect a stand alone PDA to a remote computer system or a network without having to have a desktop computer to act as the intermediary device.

SUMMARY OF THE INVENTION

Thus a need exists for an apparatus for providing mounting capabilities and enhanced communication functionality to a palmtop computer. Another need exists for an apparatus which fills the above need and which provides the user multiple mounting scenarios, for example; on the surface of a wall or on the door of a refrigerator, providing to the user an almost unlimited number of mounting and configuration possibilities. Additionally, a need exists for an apparatus which meets the above stated needs and which further provides a communication connector interface, for example a modem, that is demountably coupled to the mountable apparatus and that is further adapted to be coupled to a palmtop computer, which provides a communication connector interface to the user. These and other objects and advantages of the present invention will, no doubt, become obvious to those of ordinary skill in the art after having read the following detailed description of the preferred embodiments which are illustrated in the various drawing figures.

Accordingly, the present invention provides an apparatus for providing mounting capabilities and for providing enhanced communication functionality to a palmtop computer. The present invention further provides an apparatus which achieves the above listed accomplishment and which provides multiple mounting scenarios, for example on a wall or on the surface of a refrigerator, further providing to the user an almost unlimited number of mounting and configuration possibilities. Furthermore, the present invention also provides an apparatus that achieves the above listed accomplishments and which also provides a communication connector interface, for example a modem, adapted to be removably coupled to the mountable apparatus and further adapted to be removably coupled to a palmtop computer, which thereby provides, to the user, a communication connector interface.

The present invention provides an apparatus for enhancing the placement and communication functionality of a palmtop computer. In one embodiment, the present invention is comprised of a mountable palmtop computer cradling unit. The mountable palmtop computer cradling unit is adapted to facilitate the electrical and mechanical coupling of a palmtop computer to the palmtop computer cradling unit. In the present embodiment, the mountable apparatus is further comprised of a surface mounting portion integral of the mountable apparatus. The surface mounting portion is adapted to provide mounting capabilities of the palmtop computer cradling unit. Furthermore, the mountable apparatus is additionally comprised of a communication connector interface portion coupled to the palmtop computer cradling unit. The communication connector interface portion is adapted to provide enhanced communication functionality to a palmtop computer, once the palmtop computer is coupled to the palmtop computer cradling unit.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 13 is a front-view perspective illustration of a palmtop computer cradling unit depicted as coupled to a RJ-11 telephone cord in accordance with one embodiment of the present invention.

FIG. 14 is a front-view perspective illustration of a palmtop computer cradling unit depicted as coupled to a AC power cord which is, in turn, coupled to a RJ-11 telephone cord in accordance with one embodiment of the present invention.

DETAILED DESCRIPTION

A surface mountable palmtop computer cradling unit is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

The present invention is discussed primarily in the context of a portable computer system, such as a palmtop or personal digital assistant. However, it is appreciated that the present invention can be used with other types of devices that have the capability to access some type of central device or central site, including but not limited to palmtop computer systems.

EXEMPLARY PALMTOP PLATFORM

Figure 1A:
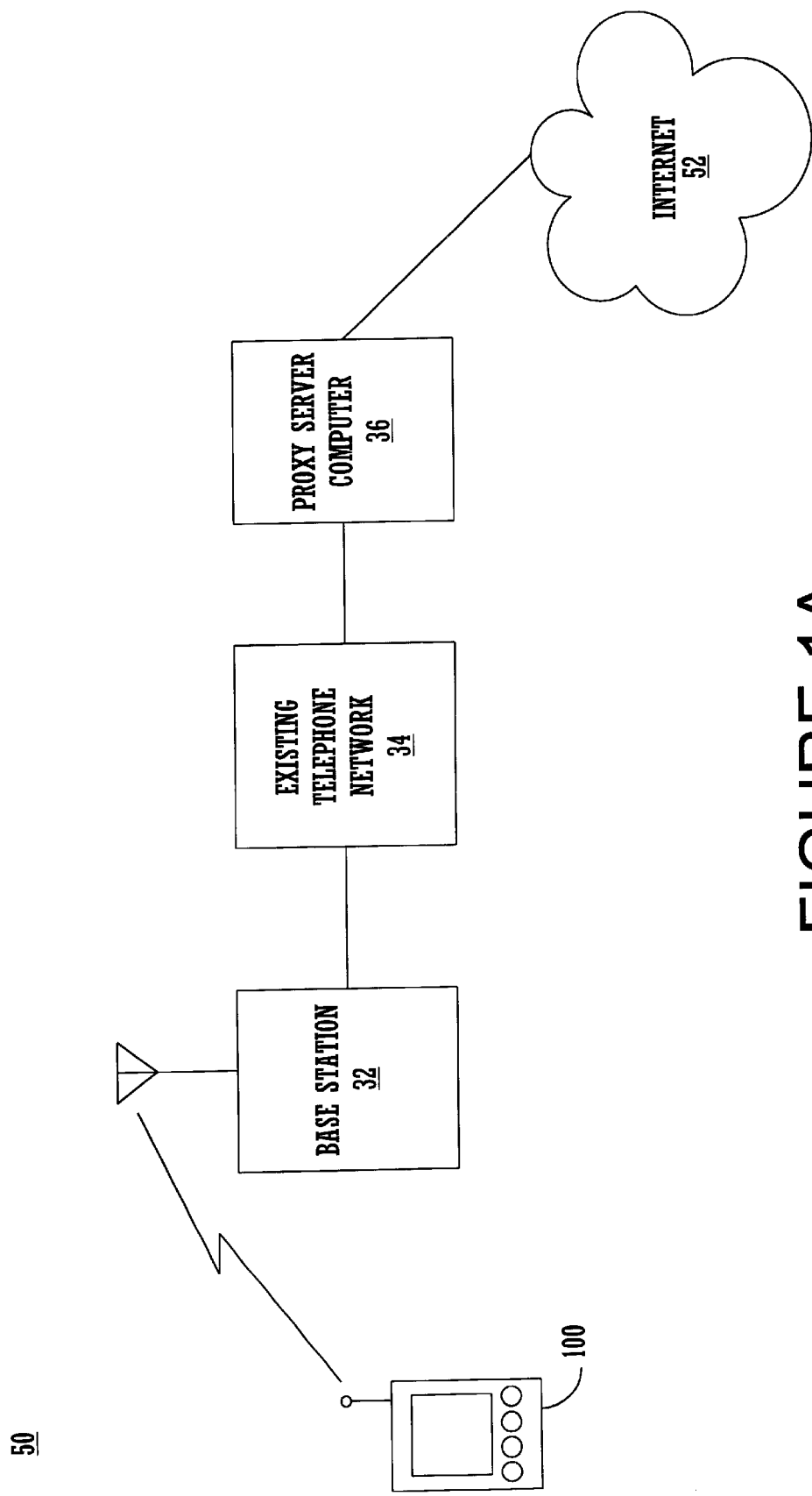
FIG. 1A is a block diagram of an exemplary network environment including a portable computer system in accordance with one embodiment of the present invention.

FIG. 1A is a block diagram of an exemplary network environment 50 including a portable computer system 100. Portable computer system 100 is also known as a palmtop or palm-sized computer system. In one embodiment, portable computer system 100 has the ability to transmit and receive data and information over a wireless communication interface (e.g., a radio interface). For purposes of the present application, the term "portable computer system" is not intended to be limited solely to conventional palmtop or portable computers. Instead, the term "portable computer" or "portable computer system" is also intended to include any mobile device which can be used to wirelessly communicate with a network. Such mobile devices include but are not limited to pagers and paging systems, wireless and cellular telephones, electronic address books, and numerous other mobile devices which have the ability to wirelessly communicate with a network. As such, for purposes of the present application, the terms "portable computer" and "mobile device" will be considered synonymous and will be used interchangeably throughout the present application.

In the present embodiment, base station 32 is both a transmitter and receiver base station, which can be implemented by coupling it into an existing public telephone network 34. Implemented in this manner, base station 32 enables portable computer system 100 to communicate with a proxy server computer system 36, which is coupled by wire to the existing public telephone network 34. Furthermore, proxy server computer system 36 is coupled to the Internet 52, thereby enabling portable computer system 100 to communicate with the Internet 52. When communicating with a Web site over Internet 52, protocols such as CTP (Compact Transport Protocol) and CML (Compact Markup Language) can be used by portable computer system 100 in the present embodiment.

One of the functions of proxy server 36 is to perform operations over the Internet 52 on behalf of portable computer system 100. For example, proxy server 36 has a particular Internet address and acts as a proxy device for portable computer system 100 over the Internet 52.

It should be further appreciated that other embodiments of a communications network, planned or envisioned, may be utilized in accordance with the present invention. For example, a wireless connection may be made from portable computer system 100 directly to the Internet 52.

The data and information which are communicated between base station 32 and portable computer system 100 are the same type of information and data that can conventionally be transferred and received over a public telephone wire network system. Additionally, in FIG. 1A, the existing telephone network could also be a packet-based network, as is the Bellsouth wireless data network utilized by some conventional portable computer systems. However, a wireless communication interface is utilized to communicate data and information between portable computer system 100 and base station 32. It should be appreciated that one embodiment of a wireless communication system in accordance with the present invention is the Mobitex wireless communication system. Furthermore, any wireless network, in addition to the Mobitex wireless network, can support the functionality to be disclosed herein.

Figure 1B:
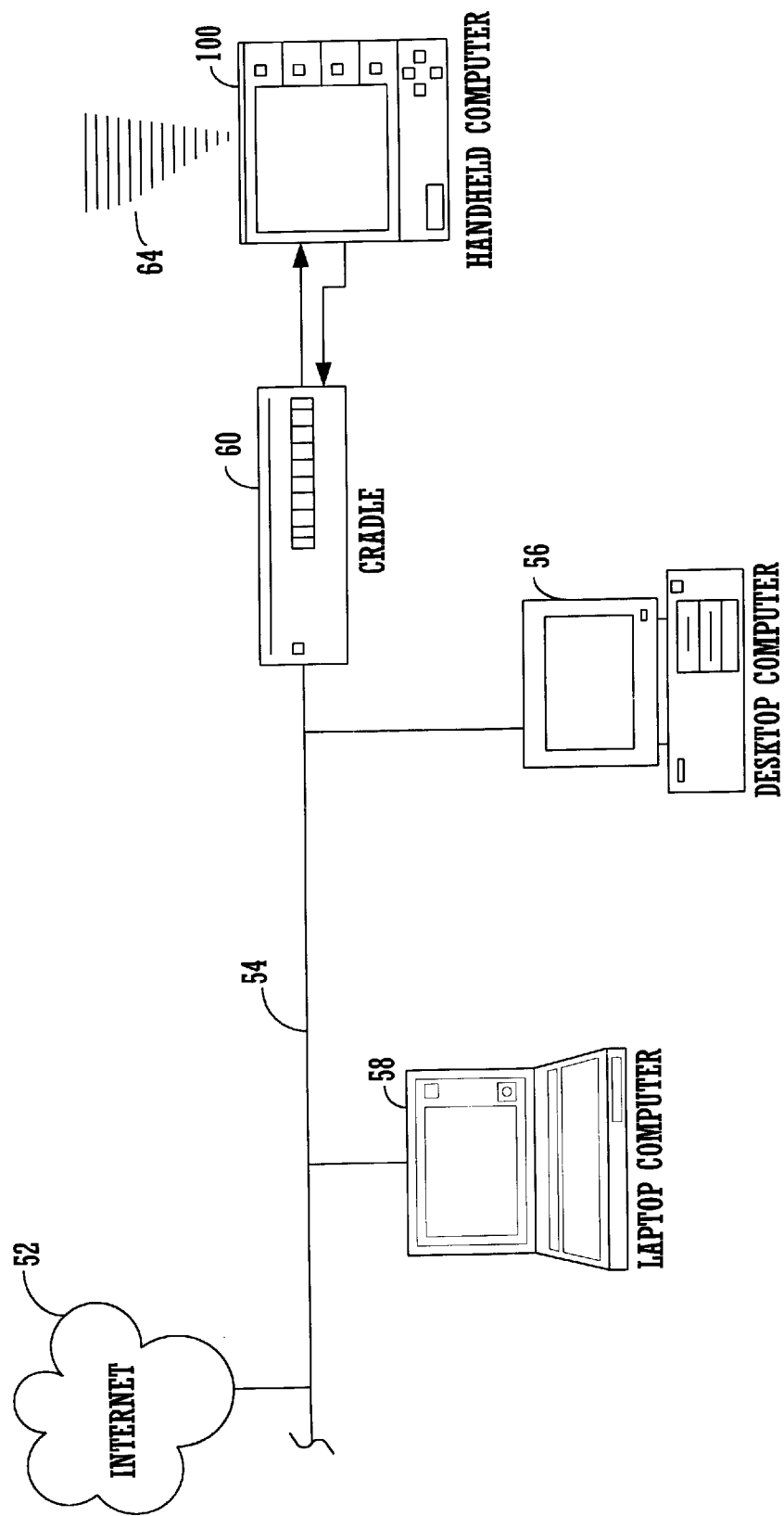
FIG. 1B is a block diagram of a portable computer system connected to other computer systems and the Internet via a cradle device in accordance with one embodiment of the present invention.

FIG. 1B illustrates another embodiment of a system 51 that can be used in conjunction with various embodiments of the present invention. System 51 comprises a host computer system 56 which can either be a desktop unit as shown, or, alternatively, can be a laptop system 58. Optionally, one or more host computer systems can be used within system 51. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well-known protocols.

Importantly, bus 54 is also coupled to a cradle 60 for receiving and initiating communication with portable computer system 100 ("handheld computer") of the present invention. Cradle 60 provides an electrical and mechanical communication interface between bus 54 (and anything coupled to bus 54) and the computer system 100 for two-way communications. It is appreciated that, in accordance with the present invention, portable computer system 100 may instead be coupled to host computer systems 56 and 58 via a wireless (radio) connection. Computer system 100 also contains a wireless infrared communication mechanism 64 for sending and receiving information from other devices. Additionally, in FIG. 1B, the existing telephone network could also be a packet-based network, as is the Bellsouth wireless data network utilized by some conventional portable computer systems.

With reference to both FIGS. 1A and 1B, it is appreciated that portable computer system 100 can be used in a network environment combining elements of networks 50 and 51. That is, as will be seen below, portable computer system 100 can include both a wireless infrared communication mechanism and a signal (e.g., radio) receiver/transmitter device.

Figure 2:
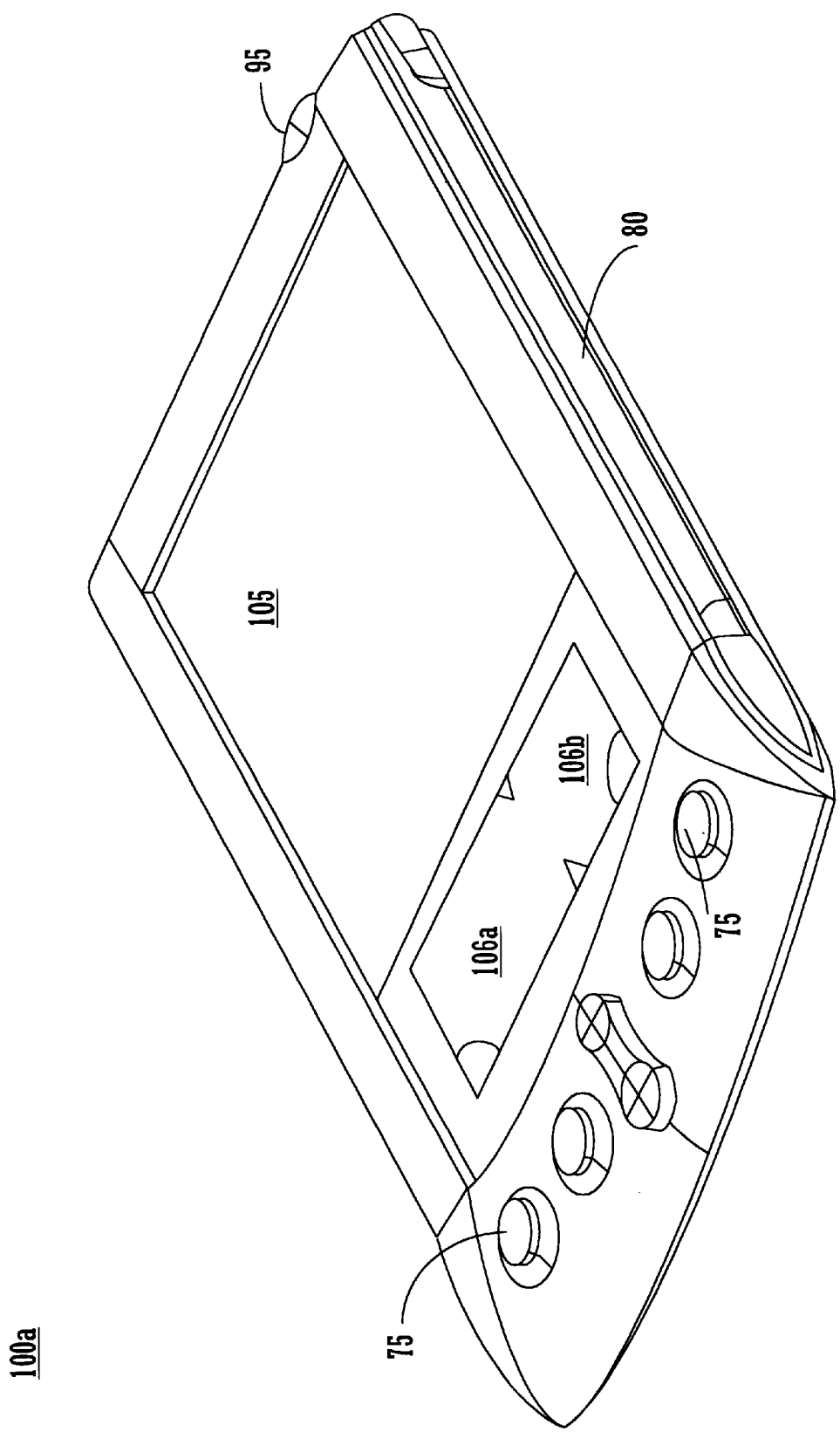
FIG. 2 is a top side perspective view of a portable computer system in accordance with one embodiment of the present invention.

FIG. 2 is a perspective illustration of the top face 100a of one embodiment of the palmtop computer system 100. The top face 100a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

FIG. 2 also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 3:
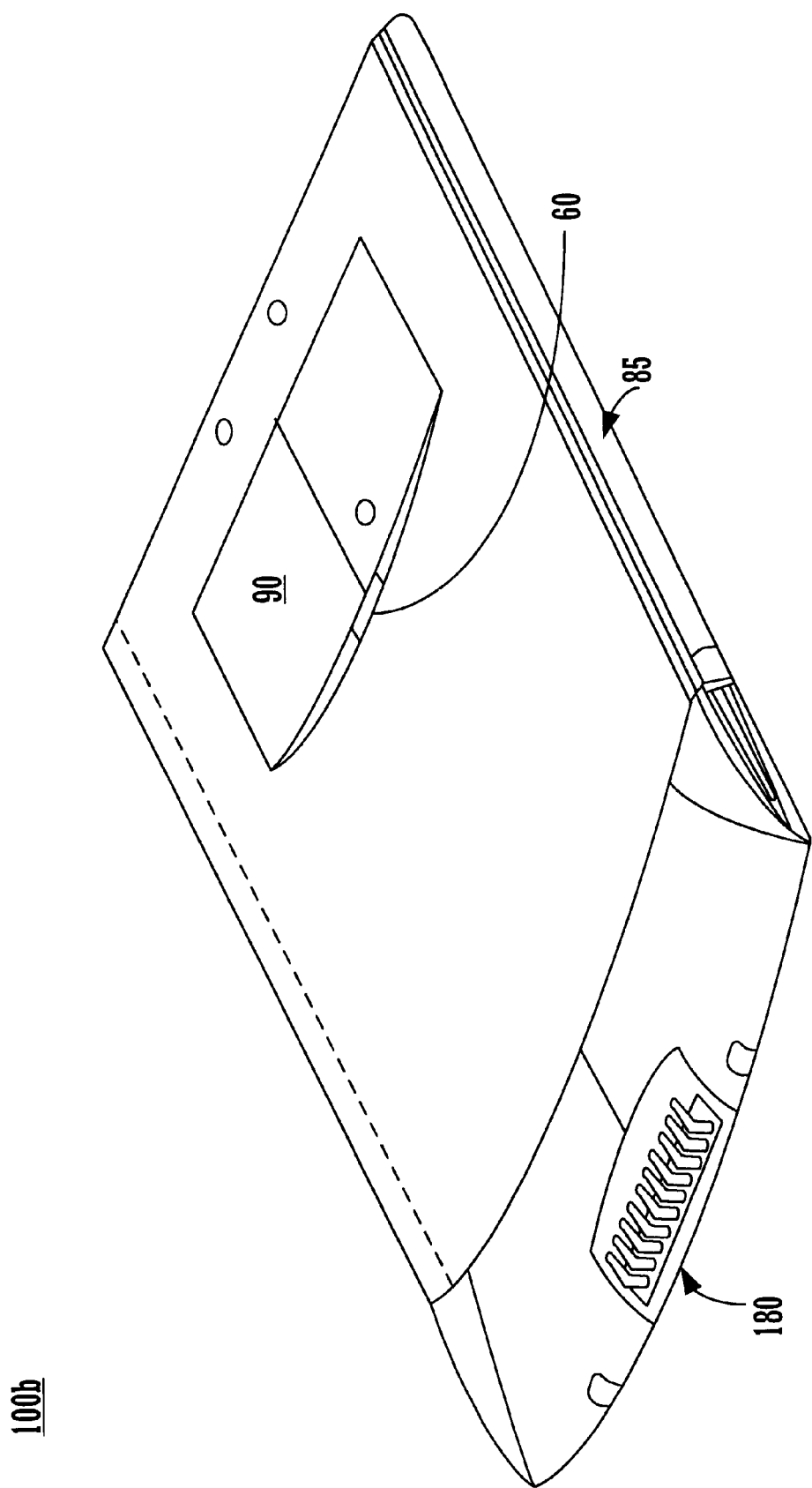
FIG. 3 is a bottom side perspective view of the portable computer system of FIG. 2.

FIG. 3 illustrates the bottom side 100b of one embodiment of the palmtop computer system that can be used in accordance with various embodiments of the present invention. An extendible antenna 85 is shown, and also a battery storage compartment door 90 is shown. Shown disposed beneath battery storage compartment door 90 is retention latch receptacle 60. A communication interface 180 is also shown. In one embodiment of the present invention, the communication interface 180 is a serial communication port, but could also alternatively be of any of a number of well-known communication standards and protocols, e.g., parallel, SCSI (small computer system interface), Firewire (IEEE 1394), USB (universal serial bus), Ethernet, etc.

Figure 4:
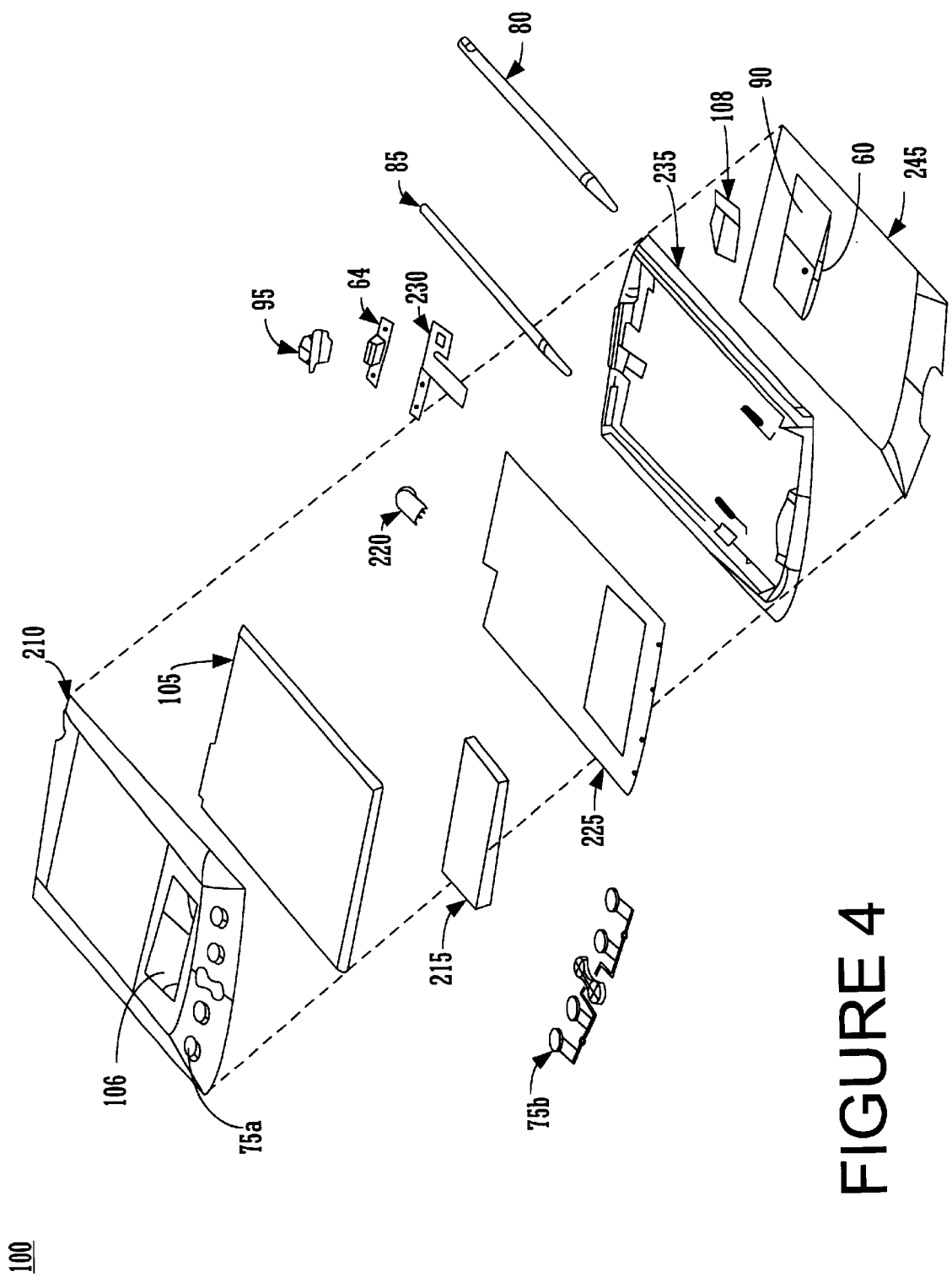
FIG. 4 is an exploded view of the components of the portable computer system of FIG. 2.

FIG. 4 is an exploded view of the palmtop computer system 100 in accordance with one implementation. Computer system 100 contains a back cover 245, and a front cover 210 having an outline of region 106 and holes 75a for receiving buttons 75b. Also shown upon back cover 245, being disposed beneath battery storage compartment door 90, is retention latch receptacle 60. A flat panel display 105 (both liquid crystal display and touch screen) fits into front cover 210. Any of a number of display technologies can be used, e.g., liquid crystal display (LCD), field emission display (FED), plasma, etc., for the flat panel display 105. A battery 215 provides electrical power. A contrast adjustment (potentiometer) 220 is also shown, as well as an on/off button 95. A flex circuit 230 is shown along with a printed circuit (PC) board 225 containing electronics and logic (e.g., memory, communication bus, processor, etc.) for implementing computer system functionality. The digitizer pad is also included in PC board 225. A midframe 235 is shown along with stylus 80. Position-adjustable antenna 85 is shown.

Infrared communication mechanism 64 (e.g., an infrared emitter and detector device) is for sending and receiving information from other similarly equipped devices (see FIG. 1B). A signal (e.g., radio) receiver/transmitter device 108 is also shown. The receiver/transmitter device 108 is coupled to the antenna 85 and also coupled to communicate with the PC board 225. In one implementation the Mobitex wireless communication system is used to provide two-way communication between computer system 100 and other networked computers and/or the Internet via a proxy server (see FIG. 1A).

Figure 5:
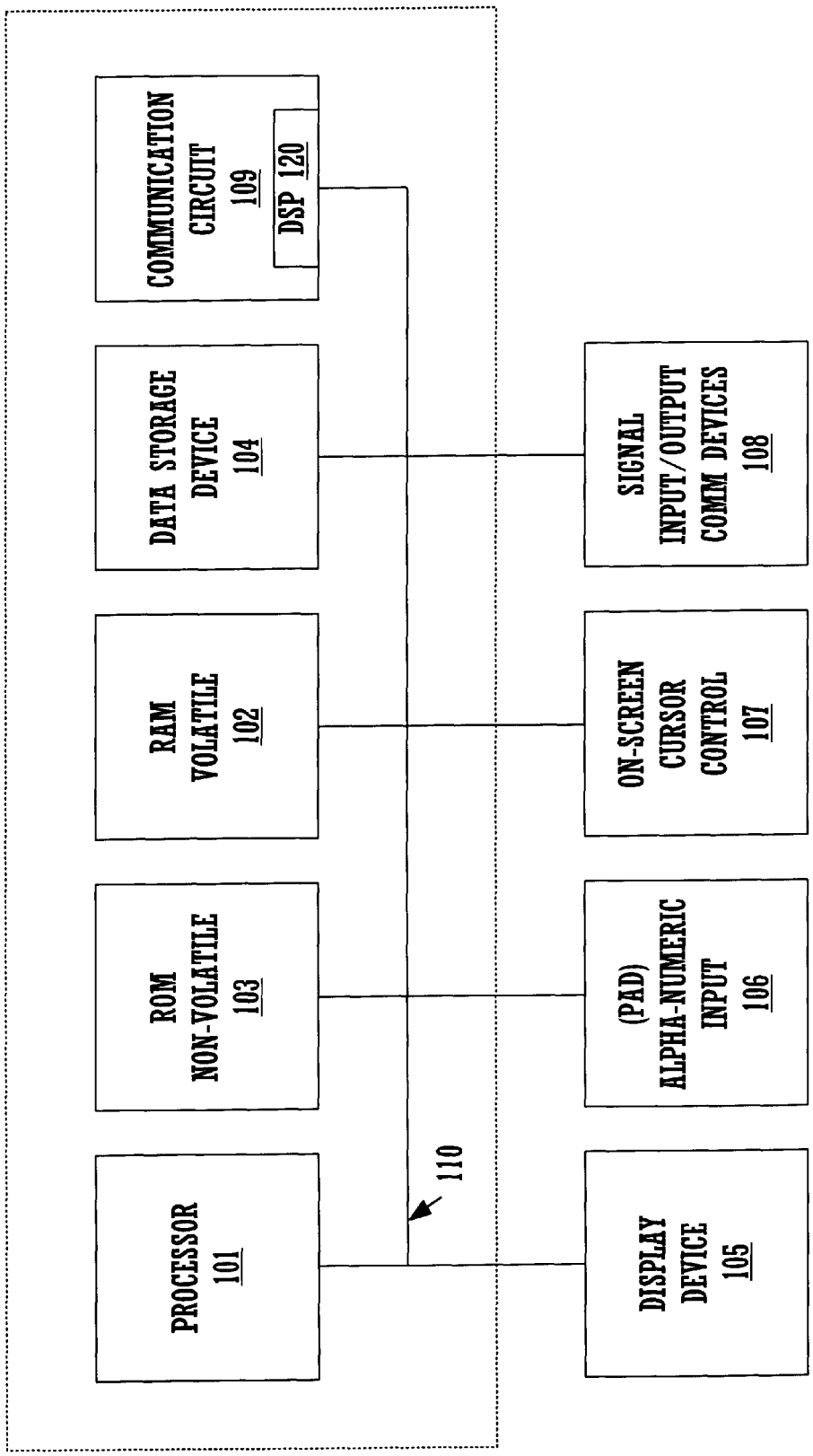
FIG. 5 is a block diagram of one embodiment of a portable computer system in accordance with the present invention.

FIG. 5 illustrates circuitry of computer system 100, some of which can be implemented on PC board 225 (FIG. 4). Computer system 100 includes an address/data bus 110 for communicating information, a central processor 101 coupled with the bus for processing information and instructions, a volatile memory 102 (e.g., random access memory, RAM) coupled with the bus 110 for storing information and instructions for the central processor 101 and a non-volatile memory 103 (e.g., read only memory, ROM) coupled with the bus 110 for storing static information and instructions for the processor 101. Computer system 100 also includes an optional data storage device 104 (e.g., memory stick) coupled with the bus 110 for storing information and instructions. Device 104 can be removable. As described above, computer system 100 also contains a display device 105 coupled to the bus 110 for displaying information to the computer user. PC board 225 can contain the processor 101, the bus 110, the ROM 103 and the RAM 102.

With reference still to FIG. 5, computer system 100 also includes a signal transmitter/receiver device 108, which is coupled to bus 110 for providing a physical communication link between computer system 100, and a network environment (e.g., network environments 50 and 51 of FIGS. 1A and 1B, respectively). As such, signal transmitter/receiver device 108 enables central processor unit 101 to communicate wirelessly with other electronic systems coupled to the network. It should be appreciated that within the present embodiment, signal transmitter/receiver device 108 is coupled to antenna 85 (FIG. 4) and provides the functionality to transmit and receive information over a wireless communication interface. It should be further appreciated that the present embodiment of signal transmitter/receiver device 108 is well suited to be implemented in a wide variety of ways. For example, signal transmitter/receiver device 108 could be implemented as a modem, or to communicate to an external modem.

In one embodiment, computer system 100 includes a communication circuit 109 coupled to bus 110. Communication circuit 109 includes an optional digital signal processor (DSP) 120 for processing data to be transmitted or data that are received via signal transmitter/receiver device 108. Alternatively, processor 101 can perform some or all of the functions performed by DSP 120.

Also included in computer system 100 of FIG. 5 is an optional alphanumeric input device 106 that in one implementation is a handwriting recognition pad ("digitizer") having regions 106a and 106b (FIG. 2), for instance. Alphanumeric input device 106 can communicate information and command selections to processor 101. Computer system 100 also includes an optional cursor control or directing device (on-screen cursor control 107) coupled to bus 110 for communicating user input information and command selections to processor 101. In one implementation, on-screen cursor control device 107 is a touch screen device incorporated with display device 105. On-screen cursor control device 107 is capable of registering a position on display device 105 where the stylus makes contact. The display device 105 utilized with computer system 100 may be a liquid crystal display device, a cathode ray tube (CRT), a field emission display device (also called a flat panel CRT) or other display device suitable for generating graphic images and alphanumeric characters recognizable to the user. In the preferred embodiment, display device 105 is a flat panel display.

Preferred Cradle Mounting Embodiments

Figure 6A:
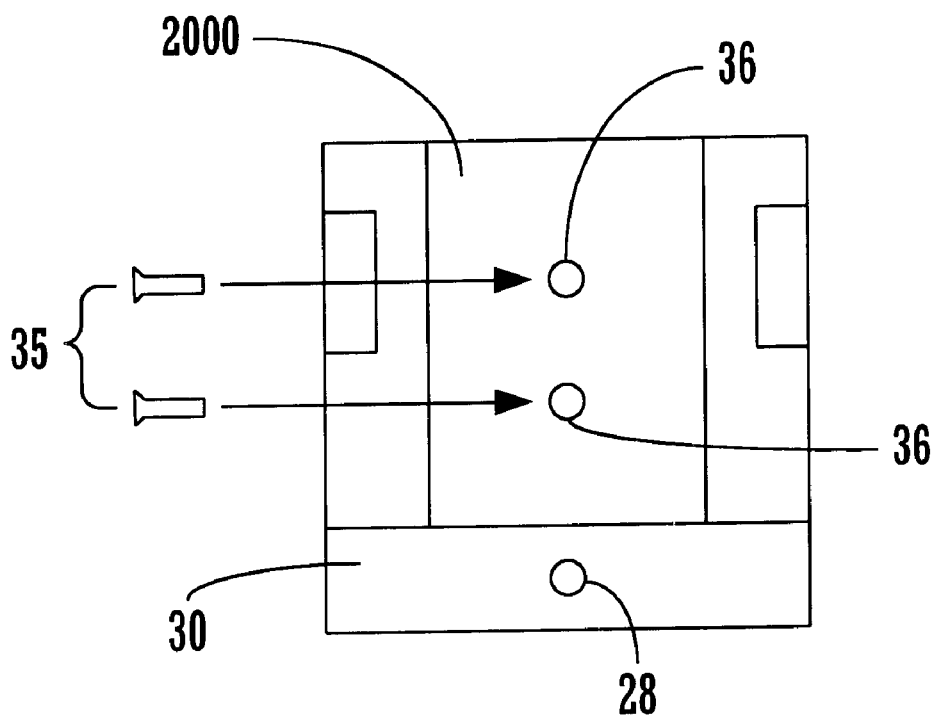
FIGS. 6A, 6B, 6C, and 6D are four illustrations of one example of a palmtop computer cradling unit in accordance with one embodiment of the present invention.

The following discussion will begin with a description of the physical structure of the embodiments of the present invention. This discussion will then be followed with a description of the operation of the present invention. It should be first appreciated that in the following embodiments of the present invention, PCCU 2000 is configured and presented as wall mountable. With reference now to FIGS. 6A, 6B, 6C, and 6D, presented are illustrations of the front, right side, coupled, and left side angled views, respectively, of palmtop computer cradling unit (PCCU) 2000, configured with an internal modem (not shown), one embodiment of the present invention. FIG. 6A, the illustration in the upper left, shows a front view of the PCCU 2000. Shown is base portion 30 which provides a positive seating stop for the palmtop computer (PDA) 100 when PDA 100 is coupled to the palmtop computer cradling unit (PCCU) 2000. Base Portion 30 is further adapted to provide unobstructed access to the function buttons disposed upon the facial surface of palmtop computer (PDA) 100. Located on base portion 30 is hot synch button 28. Hot synch button 28 enables an individual using a "powered up" PDA 100 to be communicatively linked to a "powered up" host computer system, either local or remote, which provides a means for updating information, files, schedules, and the like, from PDA 100 to the host computer system or from the host computer system to the PDA 100. Shown is screw opening 36, adapted to receive screw 35, which enables PCCU 2000 to be securely mounted upon a surface. It should be appreciated that screw 35 could be replaced with double sided sticky tape, magnets, or Velcro strips which would facilitate the mounting of the PCCU 2000 to a surface of a wall, to the surface of a refrigerator, or to a surface of a PC monitor where a non-invasive method of mounting is warranted.

Figure 6B:
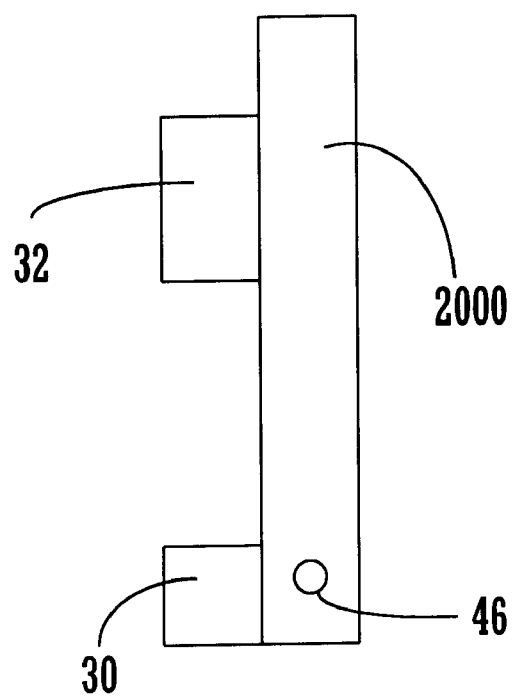

Now referring to FIG. 6B, the illustration the in the upper right, shown is a side view of palmtop computer cradling unit (PCCU) 2000. Shown as adjacent to base portion 30, and disposed upon the right side surface is phone/power input jack 46, which, in staying with the Palm tradition of a single cord coming out of a cradle has both the phone wires and the power wires contained in one cable. Phone/power input jack 46 enables the coupling of PCCU 2000 to AC power adapter 45 providing auxiliary power to the cradle, thereby reserving the energy contained in PDA 100's battery for future usage. Phone/power input jack 46 also enables the coupling of PCCU 2000 to RJ-11 telephone jack 40, which provides a means for communication between the PDA 100 and a remote computer or a network.

It should be appreciated that while PCCU 2000 is shown as having phone/power input jack 46, this should not be considered a limitation regarding the configuration. For example, PCCU 2000 may be configured without phone/ power input jack 46, thereby utilizing the energy source contained within PDA 100. PCCU 2000 may be further configured with a phone/power input jack 46 adapted to receive an RJ-45 ethernet jack in lieu of RJ-11 telephone jack 40, enabling communication via a direct network connection instead of utilizing a dial-up network. It should also be appreciated that the modem may be used to connect with a network, a remote computer system, or to the Internet for the downloading of e-mail or web clippings such as weather, sports, stocks, news, and the like. The modem may further be utilized to provide a means to "HotSynch" their PDA 100 to another computer at a remote location. It should be further appreciated that phone/power input jack 46 may take the form of other well known power sources.

It should also be further appreciated that although the internal modem (not shown) depicted in these embodiments of the present invention is configured as a 56K analog modem, it may take the form of other modems, for example; an ADSL modem, an ADSL lite modem, a cable modem, or other well known or yet to be developed communication protocols.

Figure 6C:
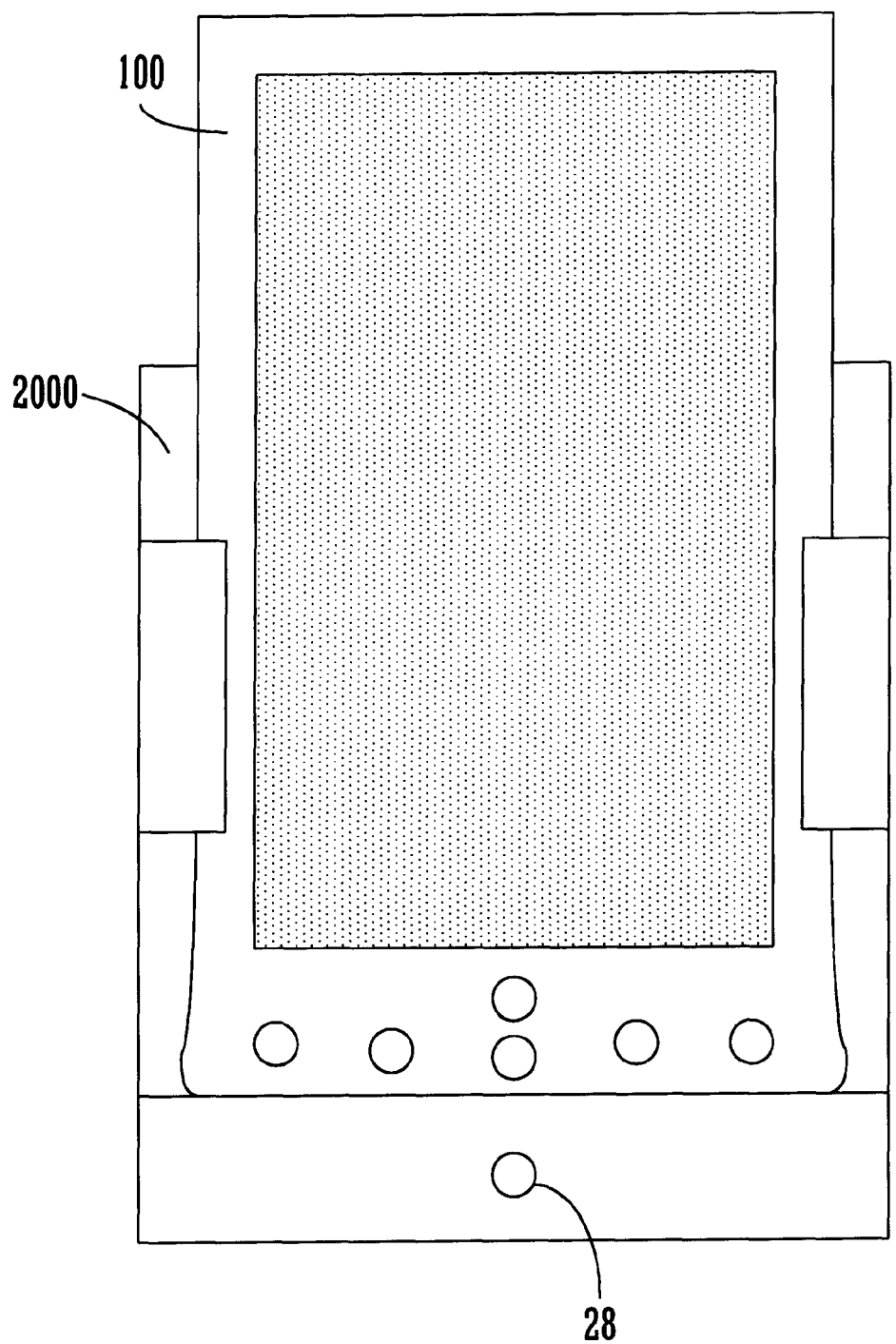
Figure 6D:
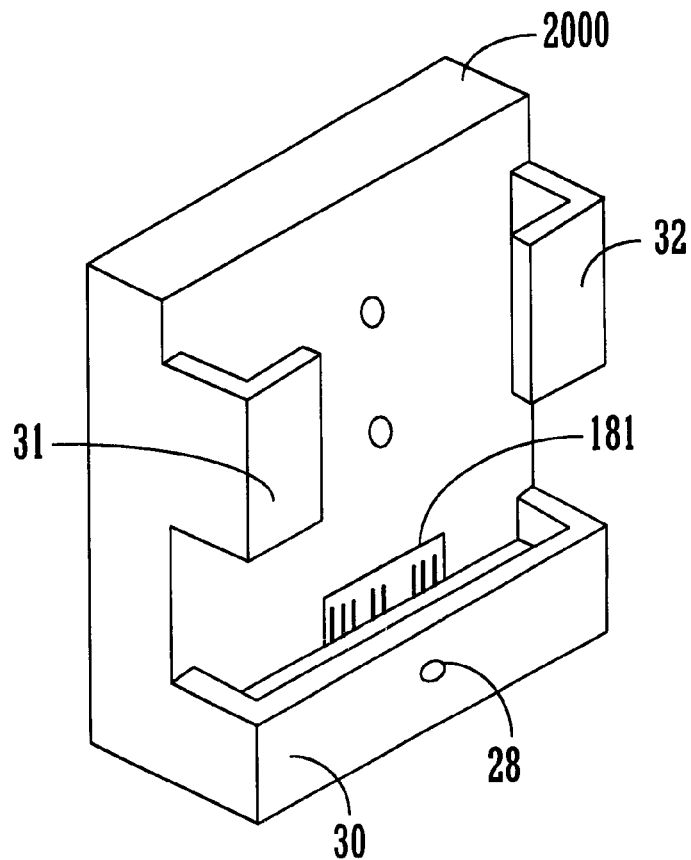
Figure 7A:
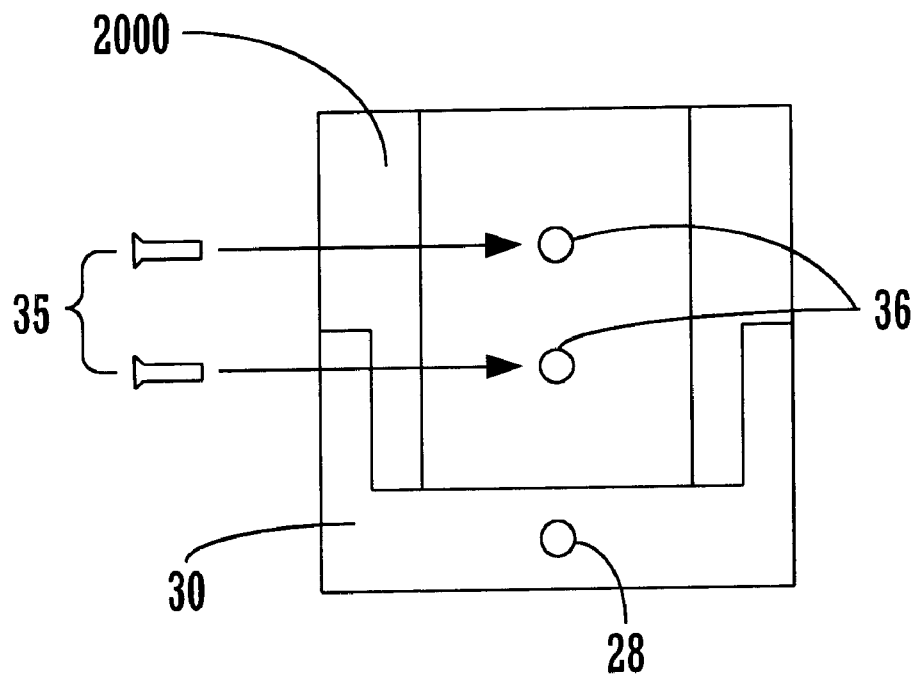
FIGS. 7A, 7B, 7C, and 7D are four illustrations of another example of a palmtop computer cradling unit in accordance with one embodiment of the present invention.
Figure 7B:
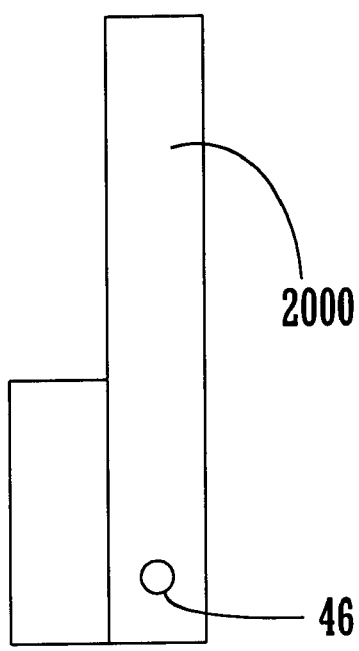
Figure 7C:
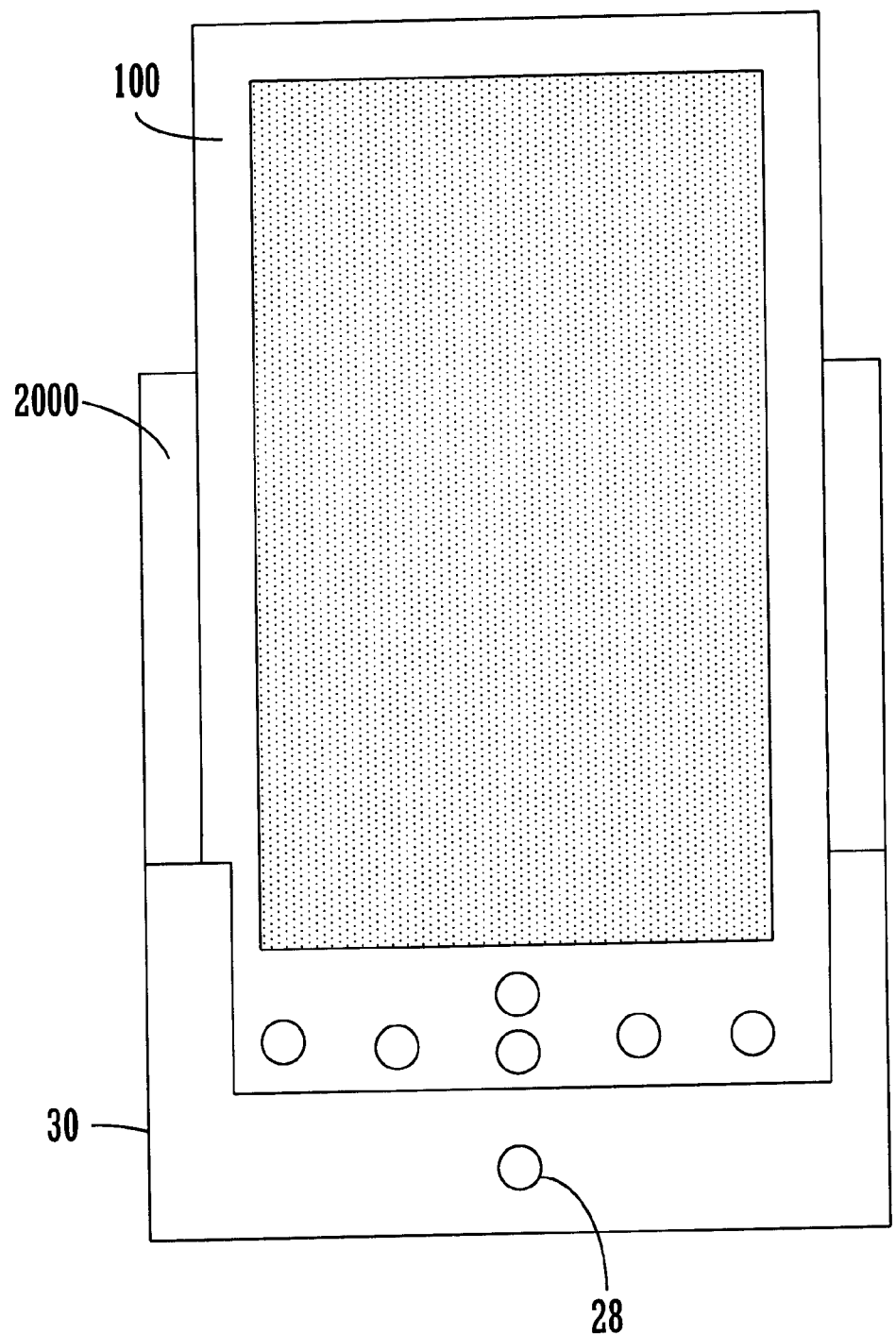
Figure 7D:
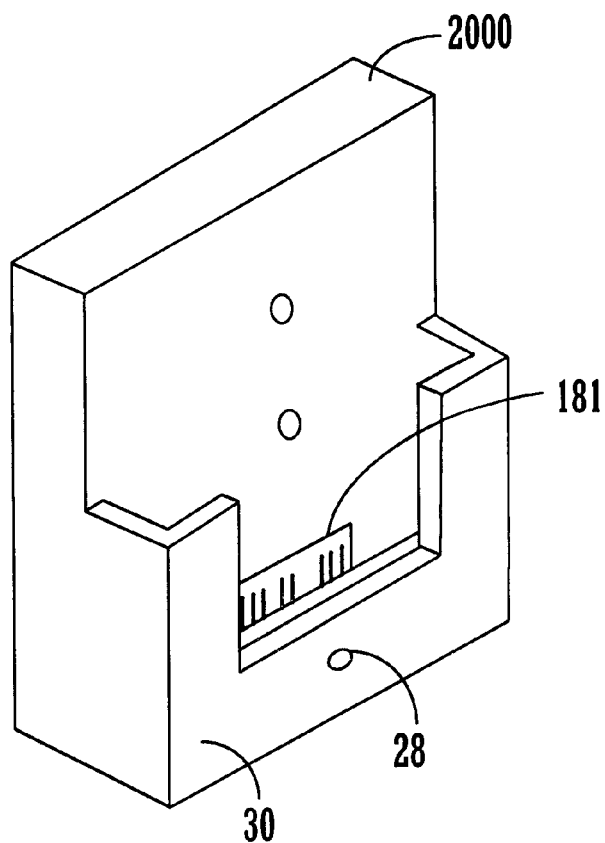

Referring now to FIG. 6C, shown is a front view of PCCU 2000 depicted as coupled to palmtop computer (PDA) 100. Referencing now FIG. 6D, depicted is an angled view of PCCU 2000. Shown is left support rail 31 and right support rail 32, both of which provide retentive and lateral support of PDA 100, when PDA 100 is coupled to PCCU 2000. Also shown is mechanical and electrical connector 181, configured and positioned to interconnect with communication interface 180 of FIG. 3, which enables communication between the PCCU 2000 and PDA 100 when PDA 100 is coupled to PCCU 2000.

Now referring to FIGS. 7A, 7B, 7C, and 7D, presented are illustrations of the front, right side, coupled, and left side angled views, respectively, of palmtop computer cradling unit (PCCU) 2000, configured with an internal modem (not shown), one embodiment of the present invention. FIGS. 7A through 7D are analogous to the embodiments of the illustrations previously described in FIGS. 6A through 6D, with one exception. In the illustrations of FIGS. 7A through 7D, instead of having left support rail 31 and right support rail 32 separate and above base portion 30 as depicted in the illustrations of FIGS. 6A through 6D, the illustrations of FIGS. 7A through 7D show the side support brackets now as an integral part of base portion 30. In this embodiment of the present invention, not only does base portion 30 perform the function of providing a positive seating stop, but also provides the retentive and lateral support, to PDA 100, once palmtop computer (PDA) 100 is coupled to palmtop computer cradling unit (PCCU) 2000. Base portion 30, in this example of one embodiment of the present invention, is also adapted to provide unobstructed access to the function control buttons disposed upon the facial surface of PDA 100 when PDA 100 is coupled to PCCU 2000.

Figure 8A:
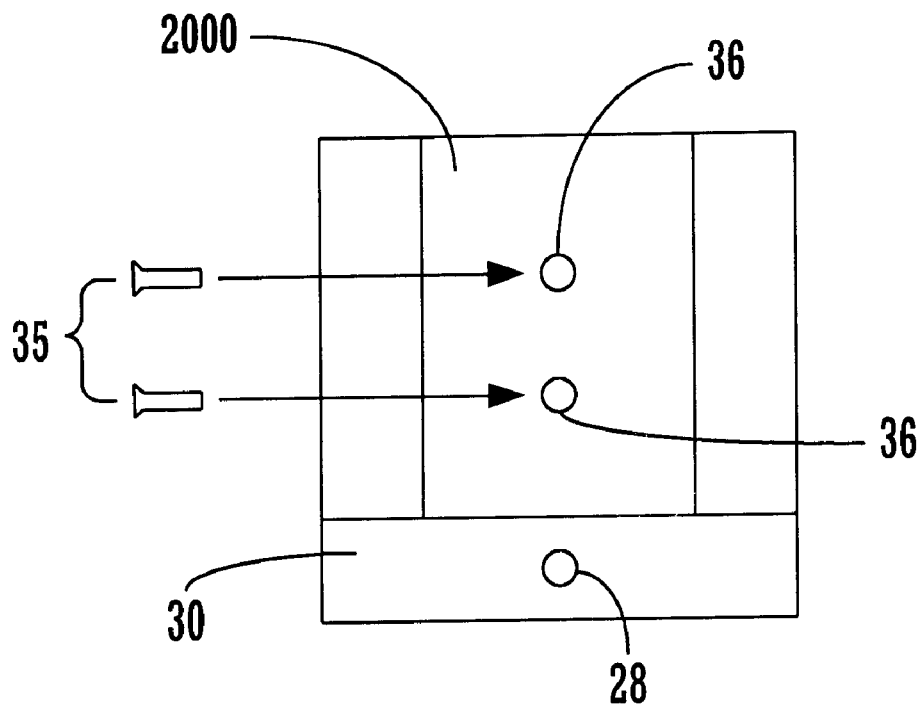
FIGS. 8A, 8B, 8C, and 8D are four illustrations of another example of a palmtop computer cradling unit in accordance with one embodiment of the present invention.
Figure 8B:
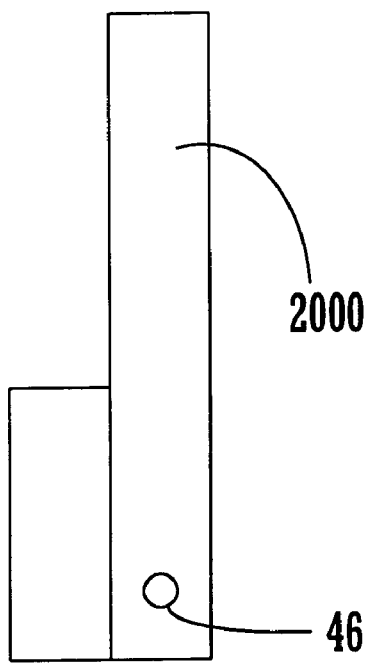
Figure 8C:
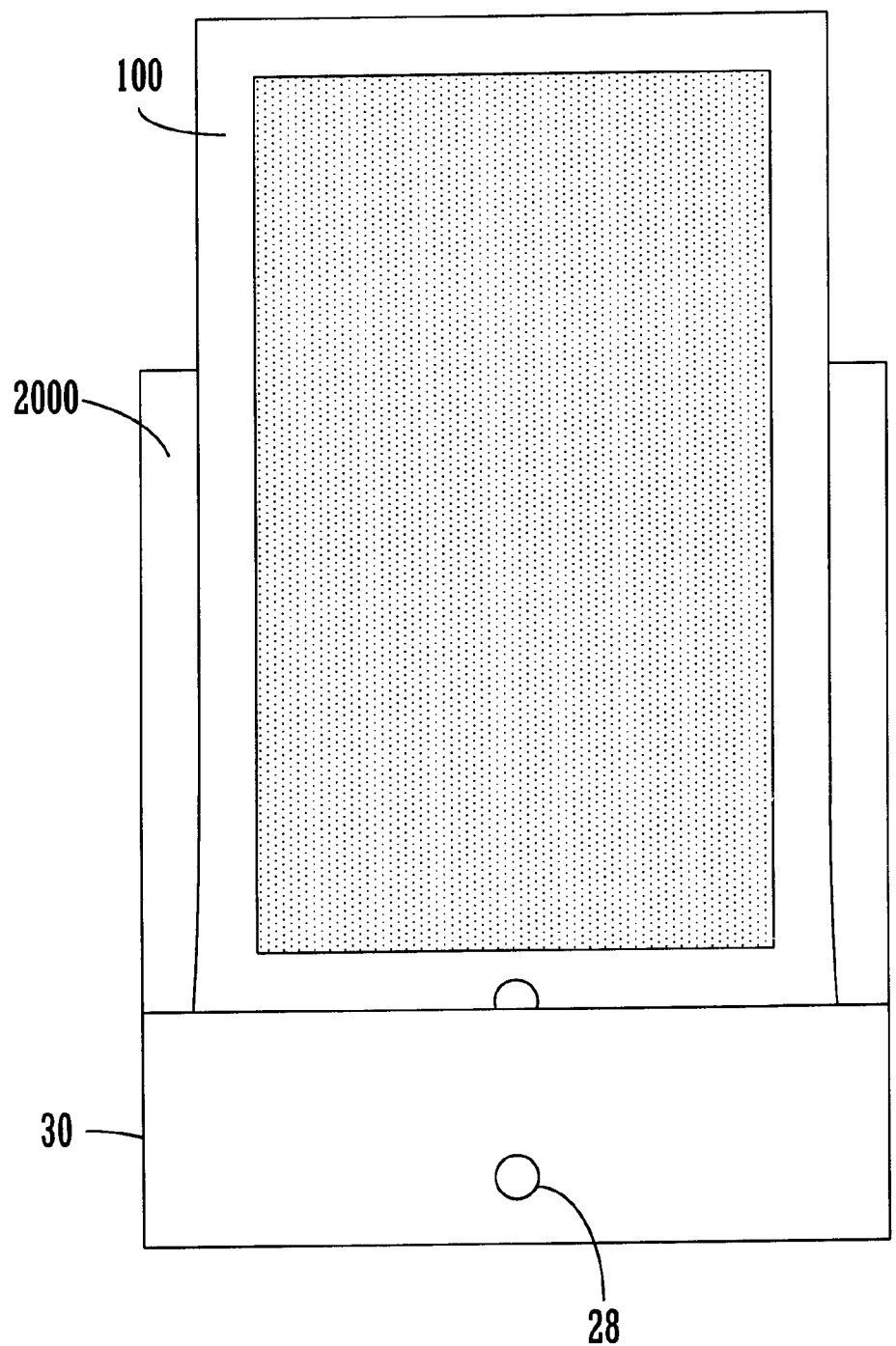
Figure 8D:
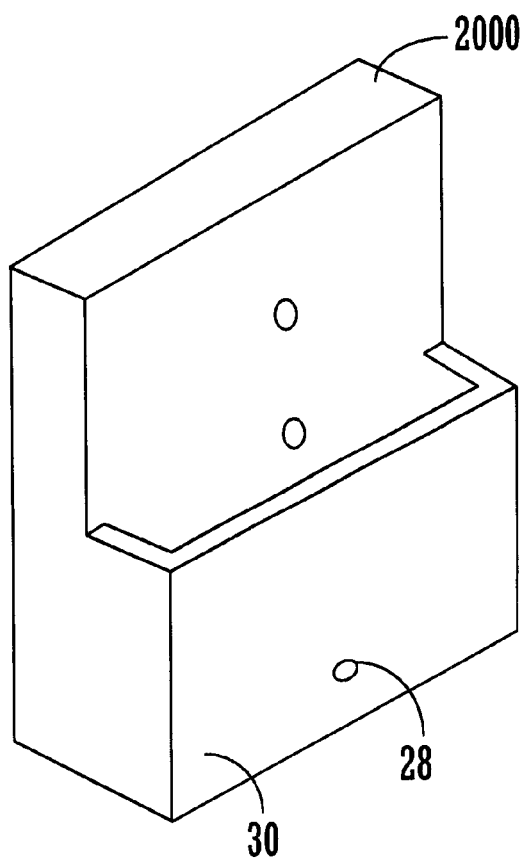

Now referring to FIGS. 8A, 8B, BC, and 8D, presented are illustrations of the front, side, angled and coupled views, respectively, of palmtop computer cradling unit (PCCU) 2000, configured with an internal modem (not shown), one embodiment of the present invention. Drawings 8A, 8B, 8C, and 8D, are analogous to the embodiments previously described in FIGS. 6A through 6D, and in FIGS. 7A through 7D, with one exception. Base portion 30 is now adapted to obstruct the access to the function control buttons disposed upon the facial surface of PDA 100, when PDA 100 is coupled to PCCU 2000. This provides a measure of protection against accidental or undesired access, for example, preventing child tampering, to the information contained within PDA 100 or the host computer system when PDA 100, coupled to PCCU 2000, is "hot synched" with the host computer system. In this example of one embodiment of the present invention, mechanical and electrical connector 181, not shown, is hidden from view by the vertically extended enclosing base portion 30.

Figure 9A:
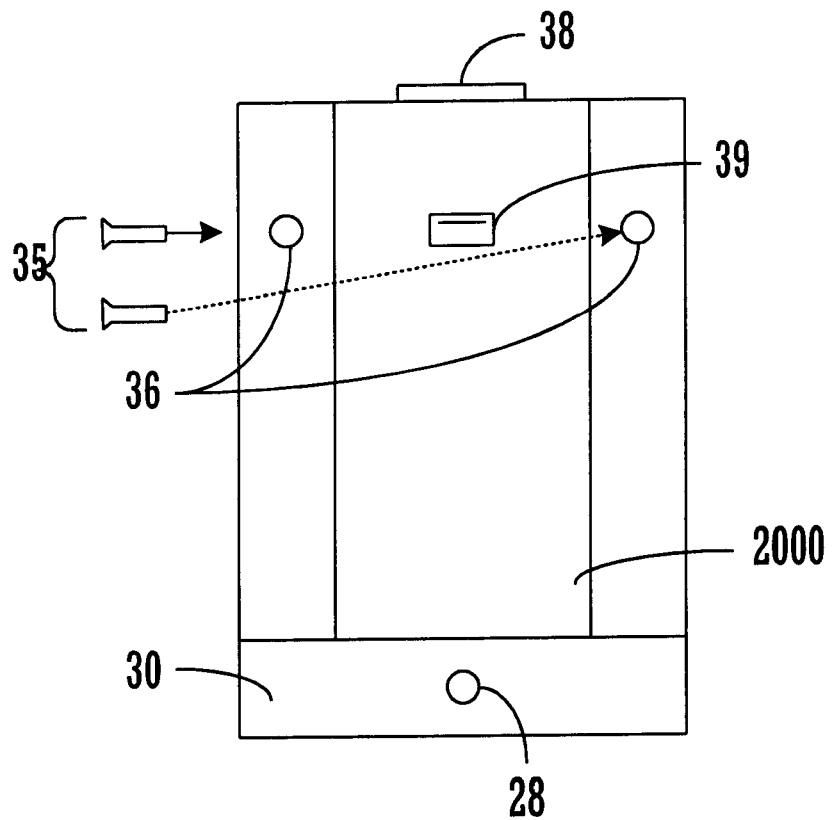
FIGS. 9A, 9B, 9C, and 9D are four illustrations of another example of a palmtop computer cradling unit in accordance with one embodiment of the present invention.

Now referring to FIGS. 9A, 9B, 9C, and 9D, presented is an illustrated perspective of the front, right side, coupled, and left side angled views, respectively, of palmtop computer cradling unit (PCCU) 2000, configured with an internal modem (not shown), one embodiment of the present invention. In FIG. 9A, in the upper left, shown is latch mechanism 39 which provides an active retentive capability to PCCU 2000 when PDA 100 is coupled to PCCU 2000. Latch mechanism 39 is adapted to engage latch receptacle 60 of FIG. 3 and FIG. 4. Shown disposed upon the top most surface area of PCCU 2000 is latch mechanism release button 38, adapted to cause the unlatching or releasing of latch mechanism 39, thereby disengaging latch mechanism 39 from latch receptacle 60 of FIG. 3 and FIG. 4, which then enables the user to uncouple PDA 100 from PCCU 2000. By virtue of the active retentive and lateral support qualities provided by latching mechanism 39, left support rail 31 and right support rail 32 of FIGS. 6A through 6D, and the vertically extended base portion 30 of FIGS. 7A through 7D and in FIGS. 8A through 8D are eliminated, which therefore allows the size of base portion 30 to be reduced, without reducing the functionality of base portion 30, with regards to providing a positive stop seat.

Figure 9B:
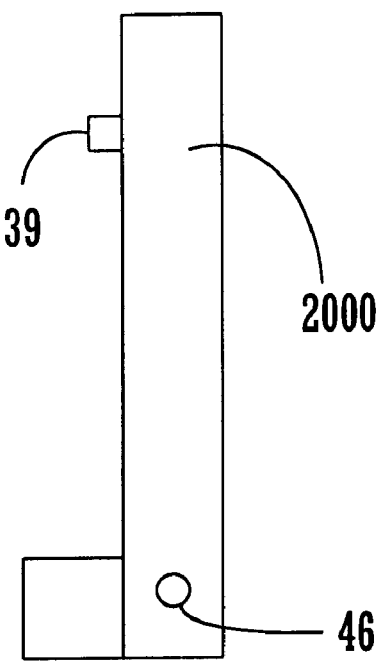
Figure 9C:
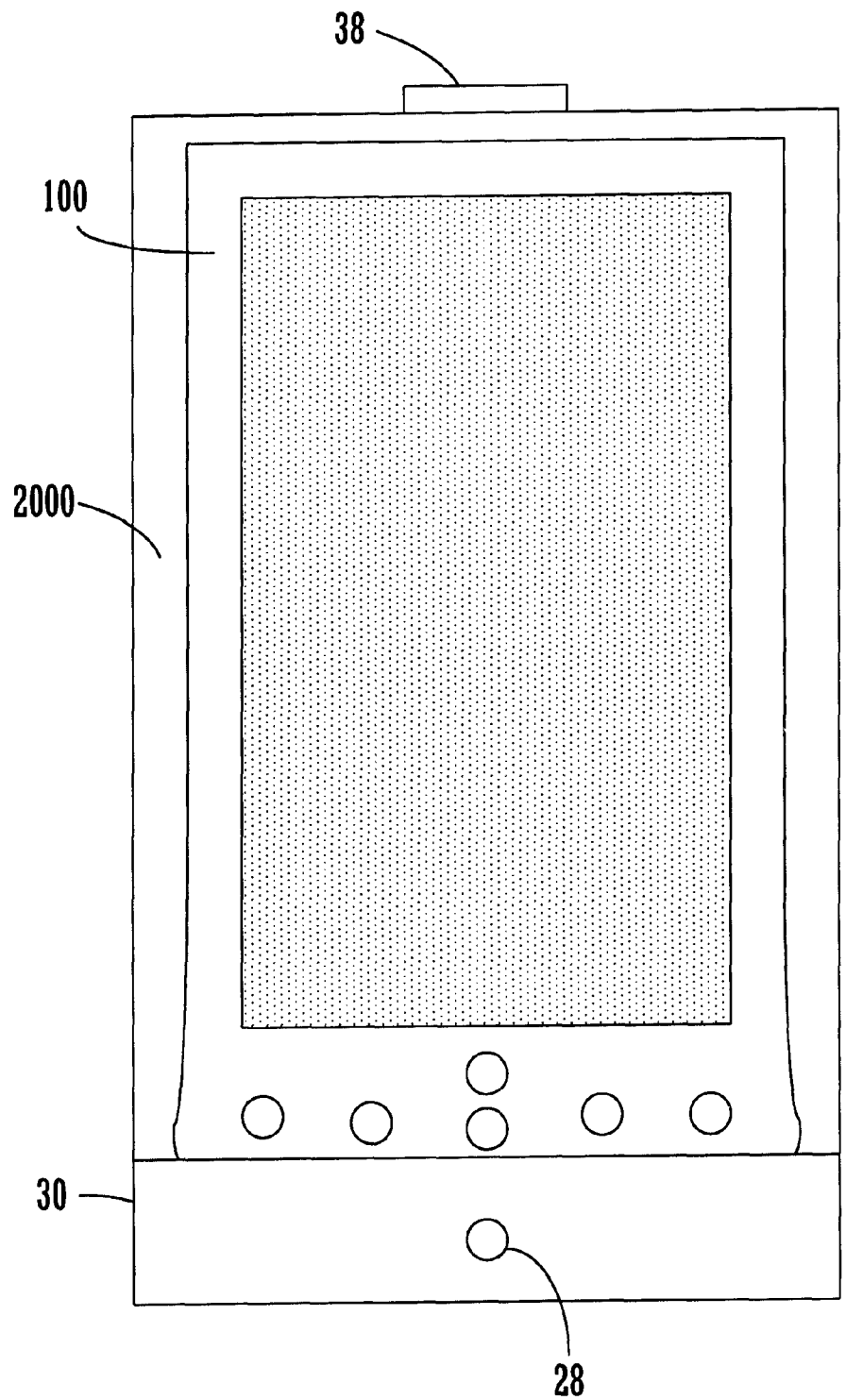
Figure 9D:
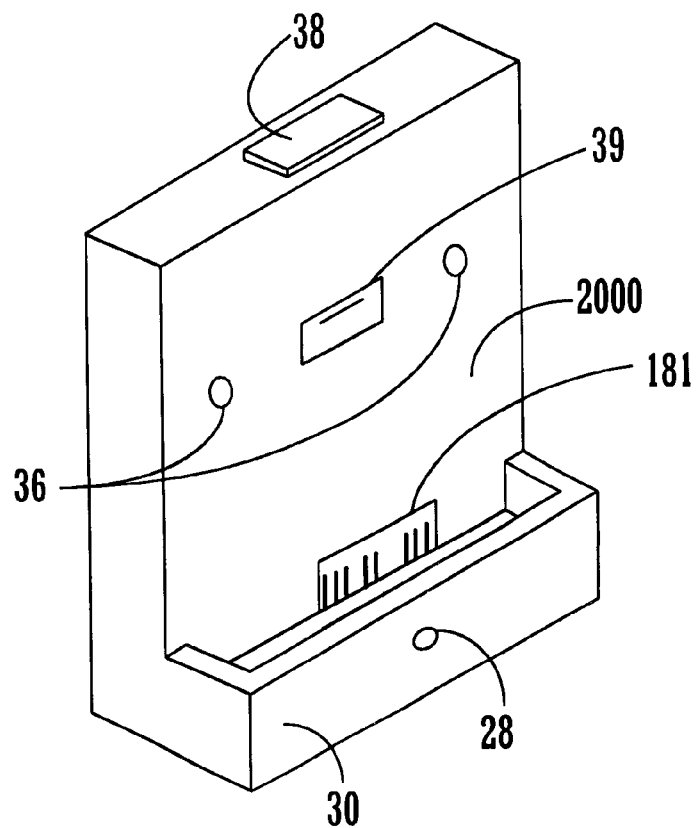

Referring now to FIGS. 9B, 9C, and 9D which provide further illustration of the disposition of latch mechanism 39 and latch mechanism release button 38. Shown also is mechanical and electrical connector 181, which, in this embodiment of the present invention, is analogous to the embodiments previously described in FIGS. 6A through 6D, 7A through 7D, and 8A through 8D respectively.

Figure 10A:
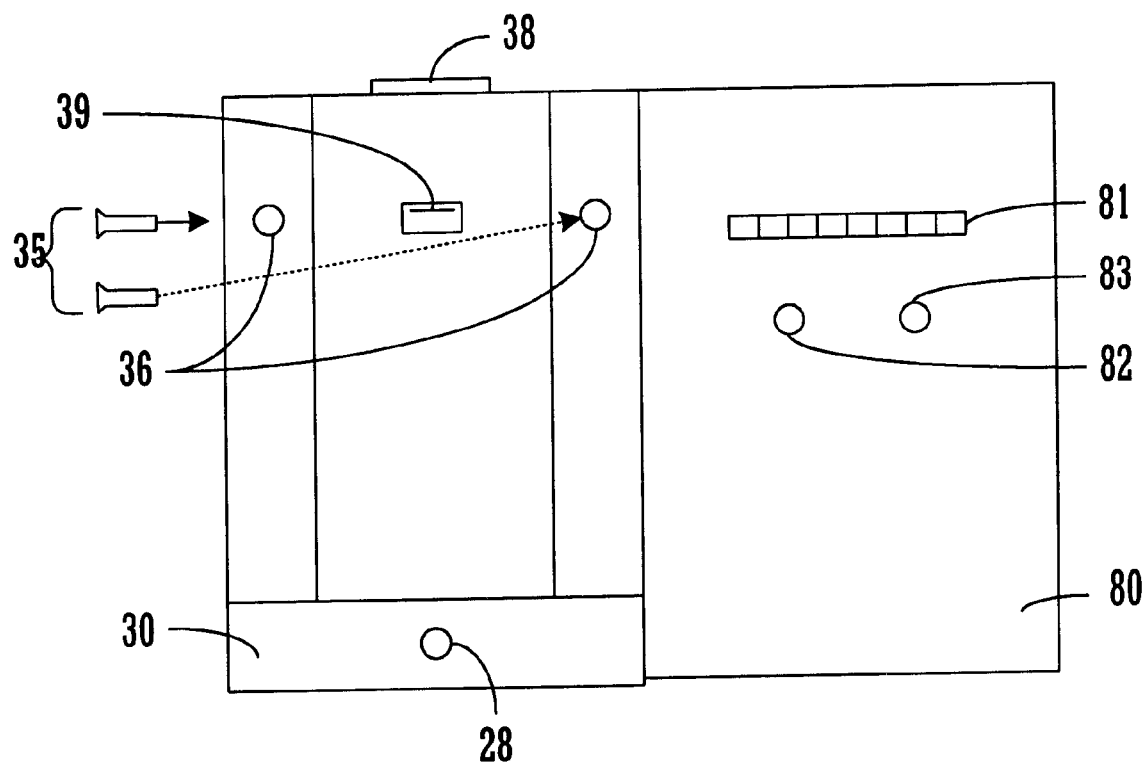
FIGS. 10A, 10B, 10C, and 10D are four illustrations of another example of a palmtop computer cradling unit in accordance with one embodiment of the present invention.
Figure 10B:
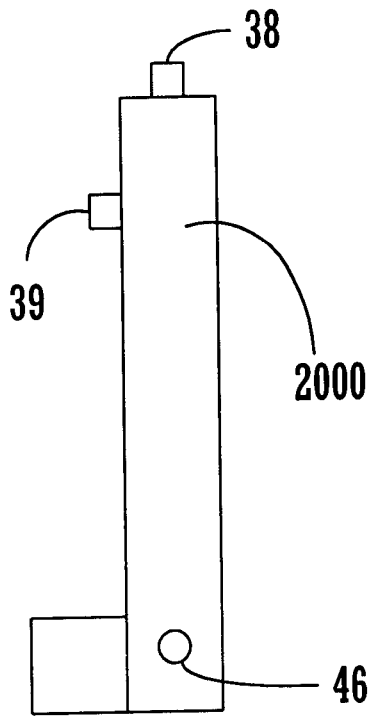
Figure 10C:
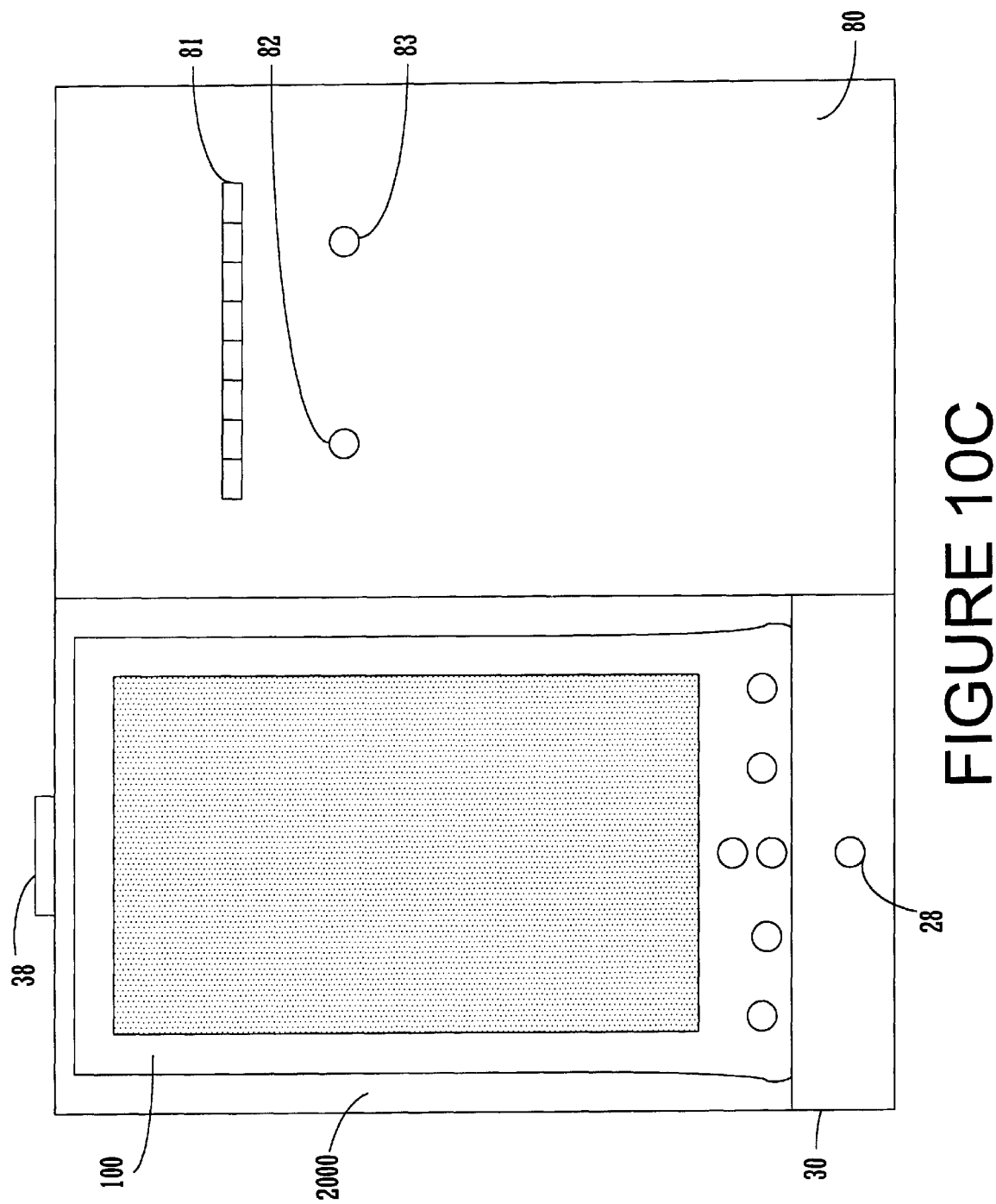
Figure 10D:
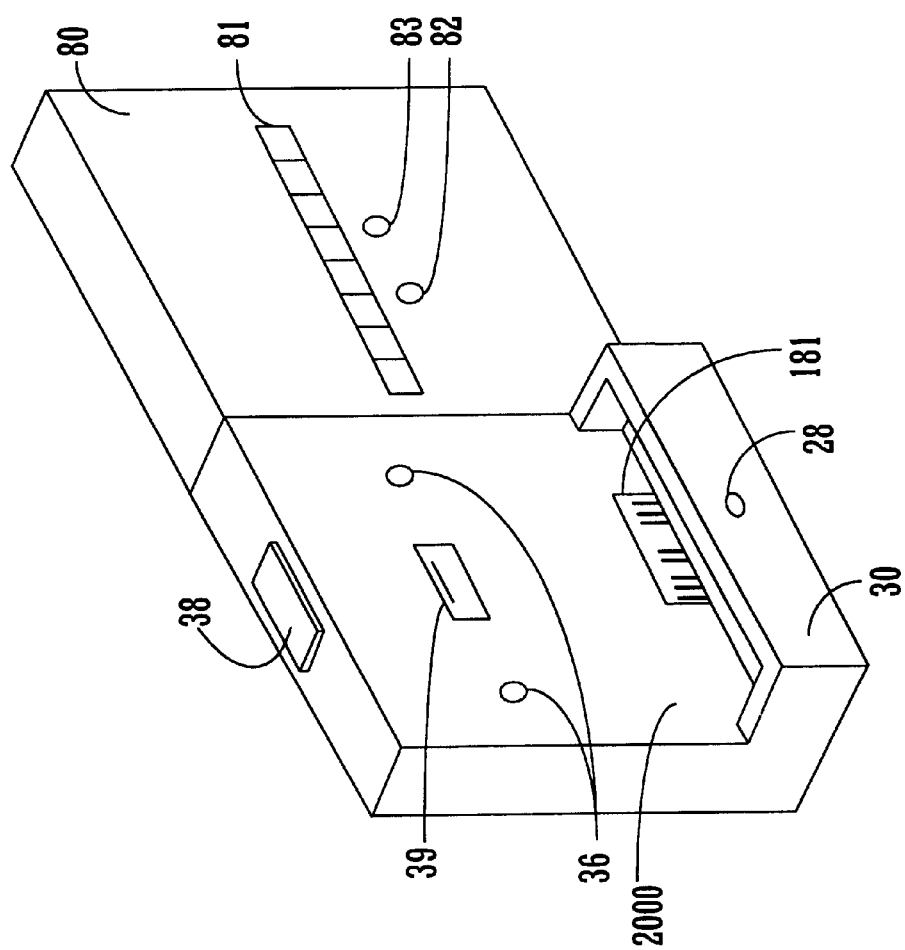

Referring now to FIGS. 10A, 10B, 10C, and 10D, presented is an illustrated perspective of the front, right side, coupled, and left side angled views, respectively, of palmtop computer cradling unit (PCCU) 2000, one embodiment of the present invention. In Drawings 10A, 10B, 10C, and 10D, depicted is PCCU 2000, analogous to the embodiments to PCCU 2000 as shown in FIG. 9A through 9D, with one addition. Now referring specifically to FIGS. 10A, 10C, and 10D, shown as being disposed on the right side of PCCU 2000 and integral to the form factor of PCCU 2000, in one embodiment of the present invention, is external modem 80, which provides communication capabilities for palmtop computer (PDA) 100 when coupled to PCCU 2000. The larger form factor, as depicted and relative to external modem 80, is to facilitate utilization of those modems, such as an ASDL modem, that require greater substrate to accommodate the associated larger circuitry. It should be appreciated that the PCCU 2000, as depicted in FIGS. 6A–6D, 7A–7D, 8A–8D, 9A–9D, and 11A–11G readily accept POTS (plain old telephone service) modems. Shown on the facial surface of external modem 80, and arranged in a horizontal pattern are light emitting diodes (LEDs) 81, adapted to provide to the user information regarding the connection provided by external modem 80. Also shown disposed upon the facial surface of external modem 80 are function control buttons 82 and 83, which are configured, in the present embodiment of the present invention, as an on button and as an off button, respectively.

Referring now to FIG. 10B, shown as being disposed upon the right side surface and oriented near the bottom of external modem 80 is phone/power input jack 46, whose form and function is analogous to the embodiments of the previously mentioned phone/power input jack 46 of FIGS. 6A–6D, 7A–7D, 8A–8D, and 9A–9D.

Figure 11A:
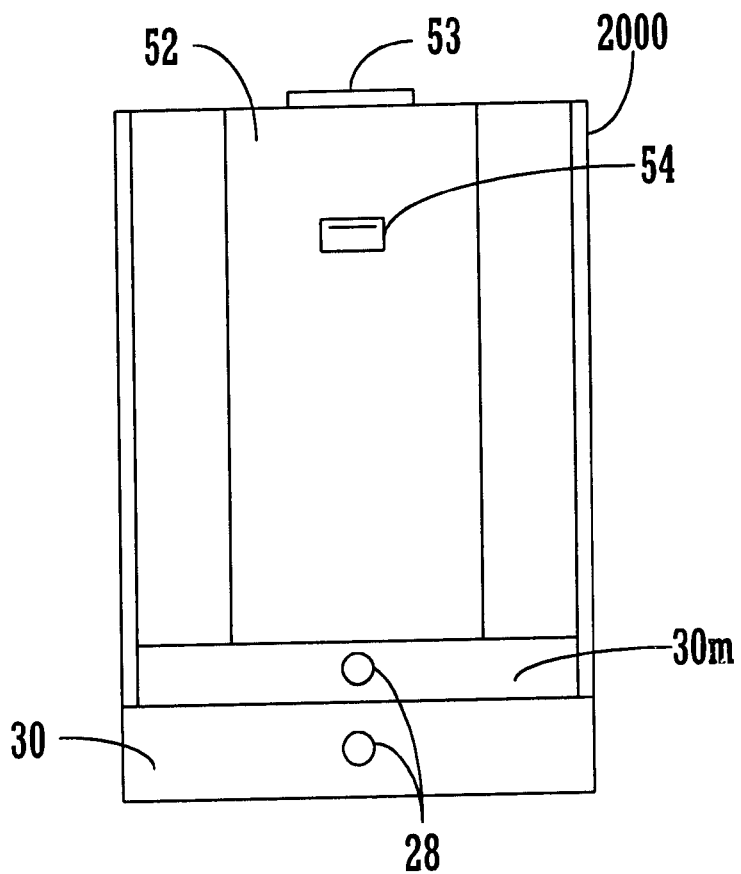
FIGS. 11A, 11B, 11C, 11D, 11E, 11F, and 11G are seven illustrations of another example of a palmtop computer cradling unit in accordance with one embodiment of the present invention.

Now with reference to FIGS. 11A, 11B, 11C, 11D, 11E, 11F, and 11G, presented are illustrations of palmtop computer cradling unit (PCCU) 2000 as one embodiment of the present invention. Commencing with FIG. 11A, in the upper left, shown is PCCU 2000 coupled to removable modem cradle 52. Removable modem cradle 52 is configured to conform to the form factor of PCCU 2000 and is adapted to be coupled to PCCU 2000. Still referring to FIG. 11A, shown disposed upon the main surface area of removable modem 52 is latching mechanism 54, analogous to the embodiments of latching mechanism 39 of FIGS. 10A–10D and 11A–11D, regarding active retention of PDA 100 when coupled to PCCU 2000. Shown as disposed upon the top most surface area of removable modem cradle 52 is latching mechanism releasing button 53, adapted to disengage latch mechanism 54, facilitating removal of palmtop computer (PDA) 100 which had been coupled to removable modem 52 which, in turn, was coupled to palmtop computer cradling unit (PCCU) 2000. Also shown in FIG. 11A and disposed upon the base portion 30 of PCCU 2000 is hot synch button 28, also instanced upon the facial surface of base portion 30m of removable modem cradle 52, both of which provide "Hot Synch" enablement of either the PCCU 2000 or the coupled removable modem cradle 52.

Figure 11B:
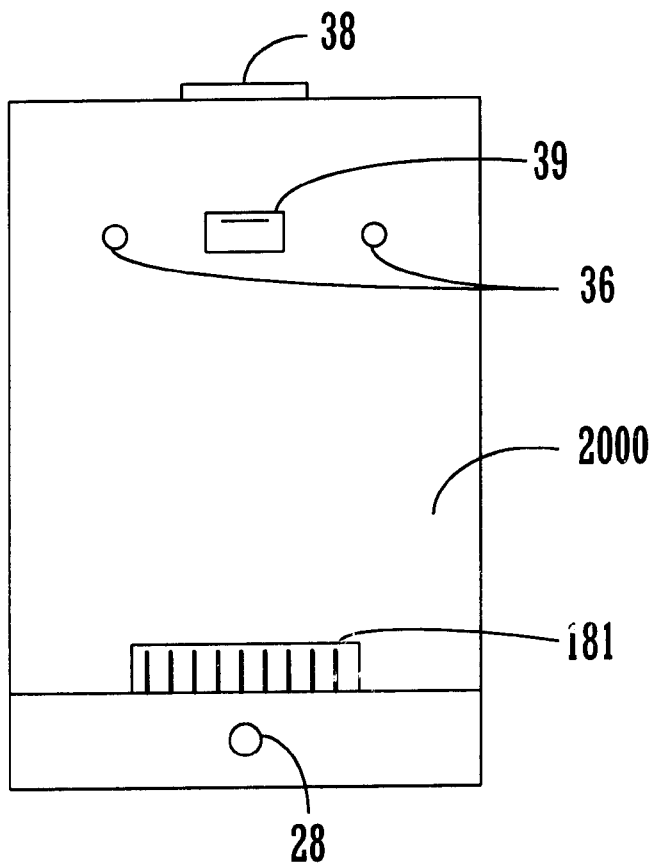

Referring now to FIG. 11B, to the right of FIG. 11A, shown is a front-view perspective illustration of PCCU 2000, one embodiment of the present invention, which was also depicted in FIG. 9. PCCU 2000 is pictured as not coupled to either PDA 100 or removable modem cradle 52. The form and function of the instancing of PCCU 2000 shown in Drawing 11B is analogous to the embodiments of PCCU 2000 as shown in FIGS. 9A–9D.

Figure 11C:
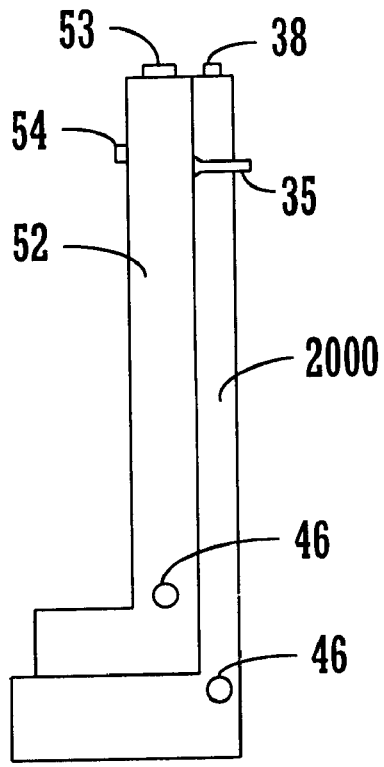

Now referencing FIG. 11C, to the right of drawing 11B, shown is side-view perspective illustration of PCCU 2000 being coupled to removable modem cradle 52. Shown on the top most surface portion of PCCU 2000 is latch mechanism release button 38 which is adapted to disengage latch mechanism 39 from coupled removable modem cradle 52. Depicted as exiting screw opening 36 is screw 35, enabling the mountability functionality of PCCU 2000. Shown also on PCCU 2000, and oriented toward the bottom of the right side surface, is phone/power input jack 46. Shown on the top most surface portion of removable modem cradle 52 is latch mechanism releasing button 53 which is adapted to disengage latch mechanism 54 from coupled PDA 100 when PDA 100 is coupled to removable modem 52. Shown also on removable. modem cradle 52, and oriented toward the bottom of the right side surface is phone/power input jack 46.

Figure 11D:
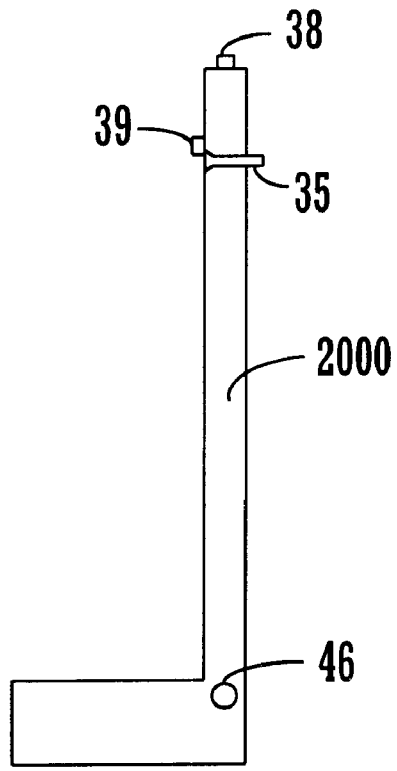

Referring now to FIG. 11D, in the upper right, shown is a side-view perspective illustration of palmtop computer cradling unit (PCCU) 2000, one embodiment of the present invention. PCCU 2000 is depicted in FIG. 11D as uncoupled to either removable modem cradle 52 or PDA 100. Depicted as exiting screw opening 36 is screw 35, enabling the mountability functionality of PCCU 2000. The form and function of the instancing of PCCU 2000 shown in FIG. 11D is analogous to the embodiments of PCCU 2000 as shown in FIGS. 9A–9D.

Figure 11E:
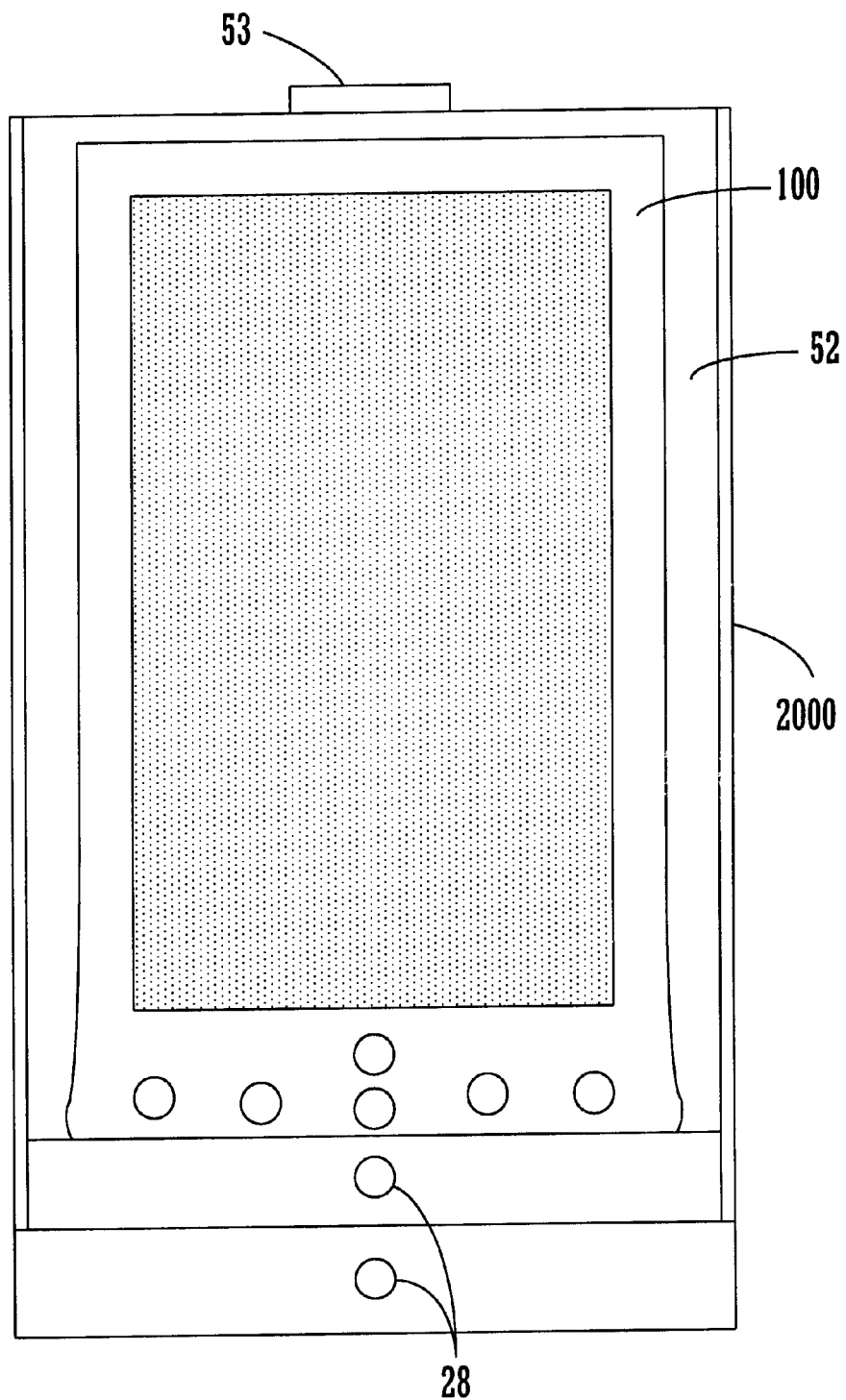

Now referring to FIG. 11E, in the lower left, shown is front view perspective illustration of palmtop computer (PDA) 100 coupled to removable modem 52 which, in turn, is coupled to PCCU 2000, in one embodiment of the present invention.

Figure 11F:
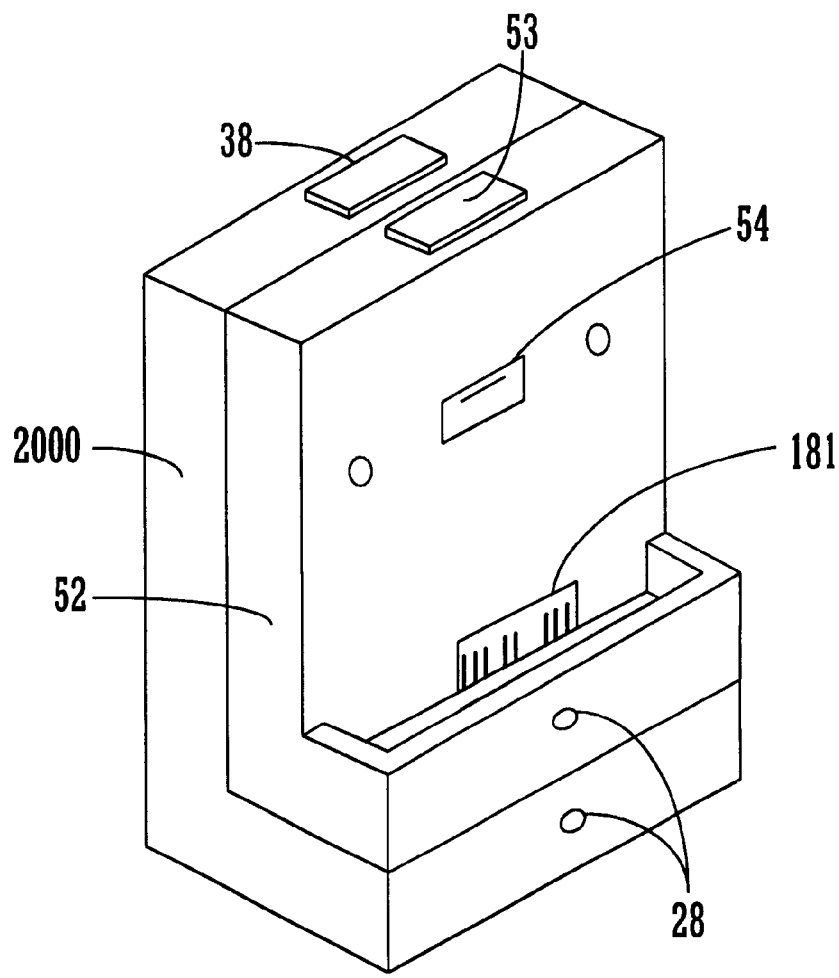

Referencing FIG. 11F, in the lower middle, shown is an angle-view perspective illustration of PCCU 2000 having been coupled to removable modem 52, in one embodiment of the present invention.

Figure 11G:
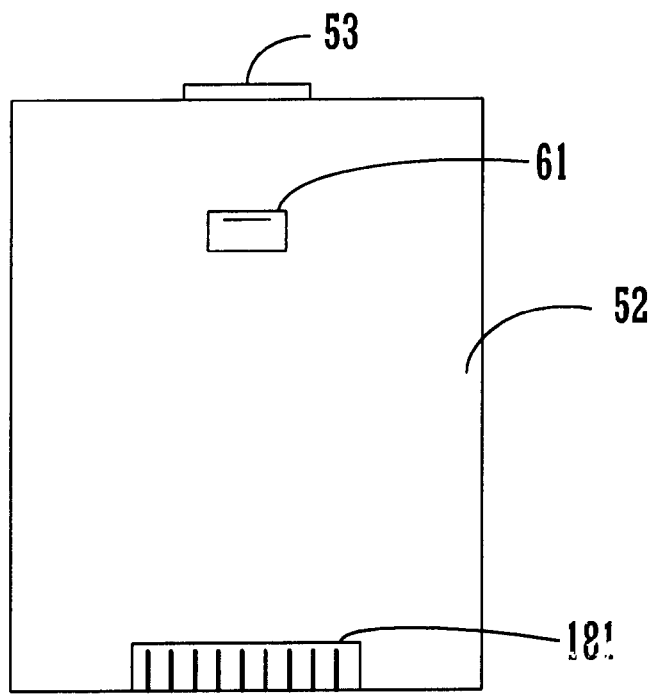

With reference now to FIG. 11G, in the lower right, shown is a backside-view of removable modem 52, one embodiment of the present invention. Shown disposed upon the back surface area is latch receptacle 61, which is configured to be engaged by latch mechanism 39 of PCCU 2000, when removable modem 52 is coupled to PCCU 2000. Also shown disposed upon the back surface area, centered along the bottom edge of removable modem 52, is mechanical and electrical connector 181 which is analogous to the embodiments of previously mentioned mechanical and electrical connector 181 in FIGS. 6A–6D, 7A–7D, 8A–8D, 9A–9D, and 10A–10D, when removable modem 52 is coupled to PCCU 2000. This embodiment of the present invention is typically implemented at home but is especially well suited for travel. By incorporating a removable modem cradle into PCCU 2000, the user may take the modem with them on their travels, thereby eliminating the reliance and usage of the slower wireless communications typically implemented in such instances.

Operation of the Present Invention

Figure 12A:
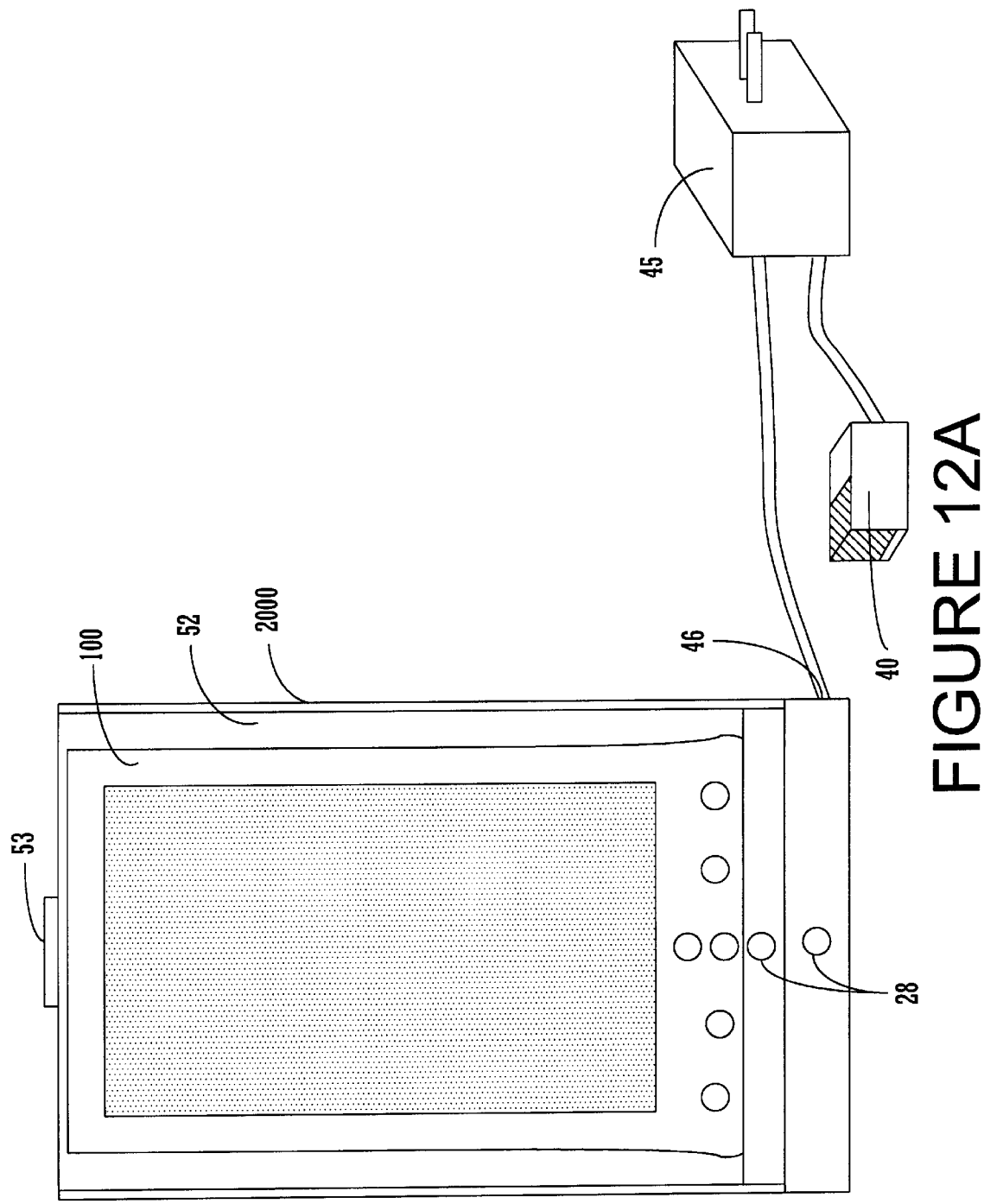
FIGS. 12A and 12B are two illustrations of another example of a palmtop computer cradling unit in accordance with one embodiment of the present invention.
Figure 12B:
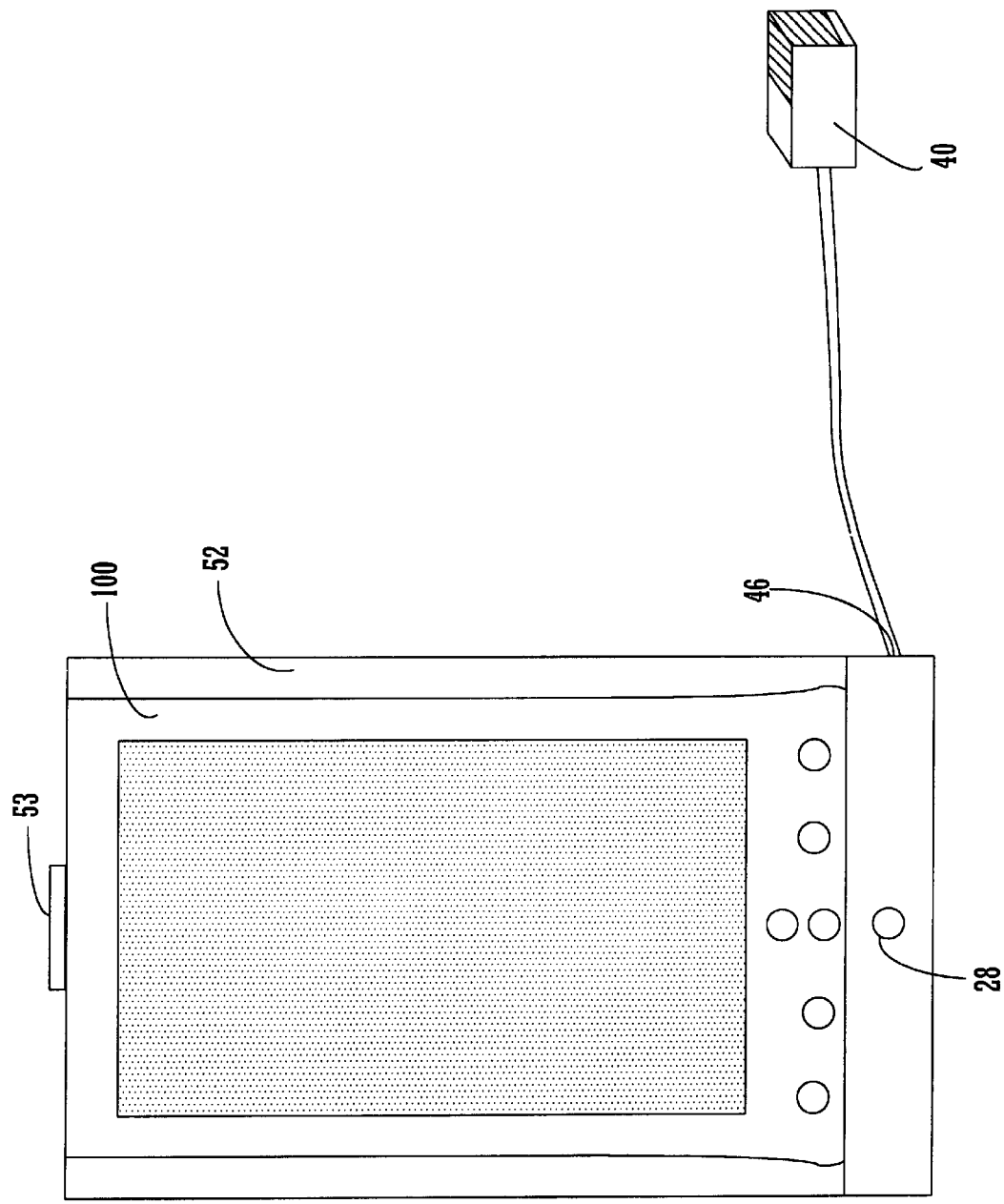

The following discussion sets forth in detail the operation of the present invention. With reference to FIGS. 12A and 12B, two front-view perspective illustrations of PCCU 2000, in accordance with the present invention, as previously described in FIGS. 11A–11G, are shown. Specifically now to FIG. 12A, on the left side, one embodiment of the present invention, which depicts palmtop computer (PDA) 100 having been coupled to removable modem 52 which is coupled to palmtop computer cradling unit (PCCU) 2000. Shown being inserted into phone/power input jack 46 is AC power adapter plug 45 which, when inserted into a wall socket, enables the operation of PCCU 2000, removable modem 52, and coupled PDA 100 with auxiliary AC power thereby preserving the energy contained in PDA 100's battery. It should be appreciated that while AC power adapter plug 45 is utilized as either an auxiliary or primary source of power, it could also be configured as having recharging capabilities, thereby providing additional functionality to PCCU 2000. Also shown coupled to AC power adapter plug 45 is RJ-11 telephone plug 40, which provides a communication connection for a dial-up connection to a remote or network computer system, or to the Internet for the downloading of e-mail or web clippings such as weather, sports, stocks, news, and the like.

Now referring to FIG. 12B, on the right side, shown is PDA 100 coupled to removable modem 52, one embodiment of the present invention. Removable modem 52 is shown having RJ-11 telephone jack 40 inserted into phone/power input jack 46 which enables communication via a dial-up connection to a network, a remote computer system, or to the Internet for the downloading of e-mail or web clippings such as weather, sports, stocks, news, and the like. In this embodiment of the present invention, removable modem cradle 52 is not using PCCU 2000 to provide its power supply, but is instead utilizing the available power supplied by the battery contained within PDA 100. As configured, removable modem cradle 52 is designed to provide portability to the user by being demountably coupled to PCCU 2000, enabling the individual to utilize removable modem cradle 52 whether coupled to PCCU 2000 or as an independent modem, in and of itself. Removable modem cradle 52 could also be coupled to another PCCU 2000 in a different location, for example; in a hotel or motel room so equipped, or in a conference room, also so equipped, or anywhere that is equipped with a PCCU 2000.

With reference to FIG. 13, a front-view perspective illustration of palmtop computer cradling unit (PCCU) 2000, one embodiment of the present invention, as previously described in FIGS. 6A–6D. PCCU 2000, shown as wall mountable which, when mounted in, for example, the kitchen, provides easy access to and from a central location within a house. PCCU 2000, shown as configured with an internal modem (not pictured), is to have coupled to it palmtop computer (PDA) 100 in accordance with the present invention. Providing the communication interface is RJ-11 telephone jack 40, inserted into phone/power input jack 46, enabling access via a dial-up connection to a network, a remote computer system, or to the Internet for the downloading of e-mail or web clippings such as weather, sports, stocks, news, and the like. Configured to operate without AC power adapter 45 being coupled to phone/power input jack 46, the cur rent embodiment of the present invention is powered by the battery contained within the coupled PDA 100.

Now referring to FIG. 14, a front-view perspective illustration of PCCU 2000 is shown, one embodiment of the present invention, as previously described in FIGS. 6A–6D. PCCU 2000, shown as wall mountable and configured with an internal modem (not pictured), is to have coupled to it PDA 100 in accordance with the present invention. PCCU 2000 is configured to be operated with AC power, which is supplied by AC power adapter 45, coupled to phone/power input jack 46, being plugged into an available AC wall plug. PCCU 2000 is also configured to utilize the RJ-11 telephone jack 40 which is coupled to AC power adapter 45, enabling a dial-up connection to a network, remote computer system, or to the Internet for the downloading of e-mail or web clippings such as weather, sports, stocks, news, and the like.

Figure 15:
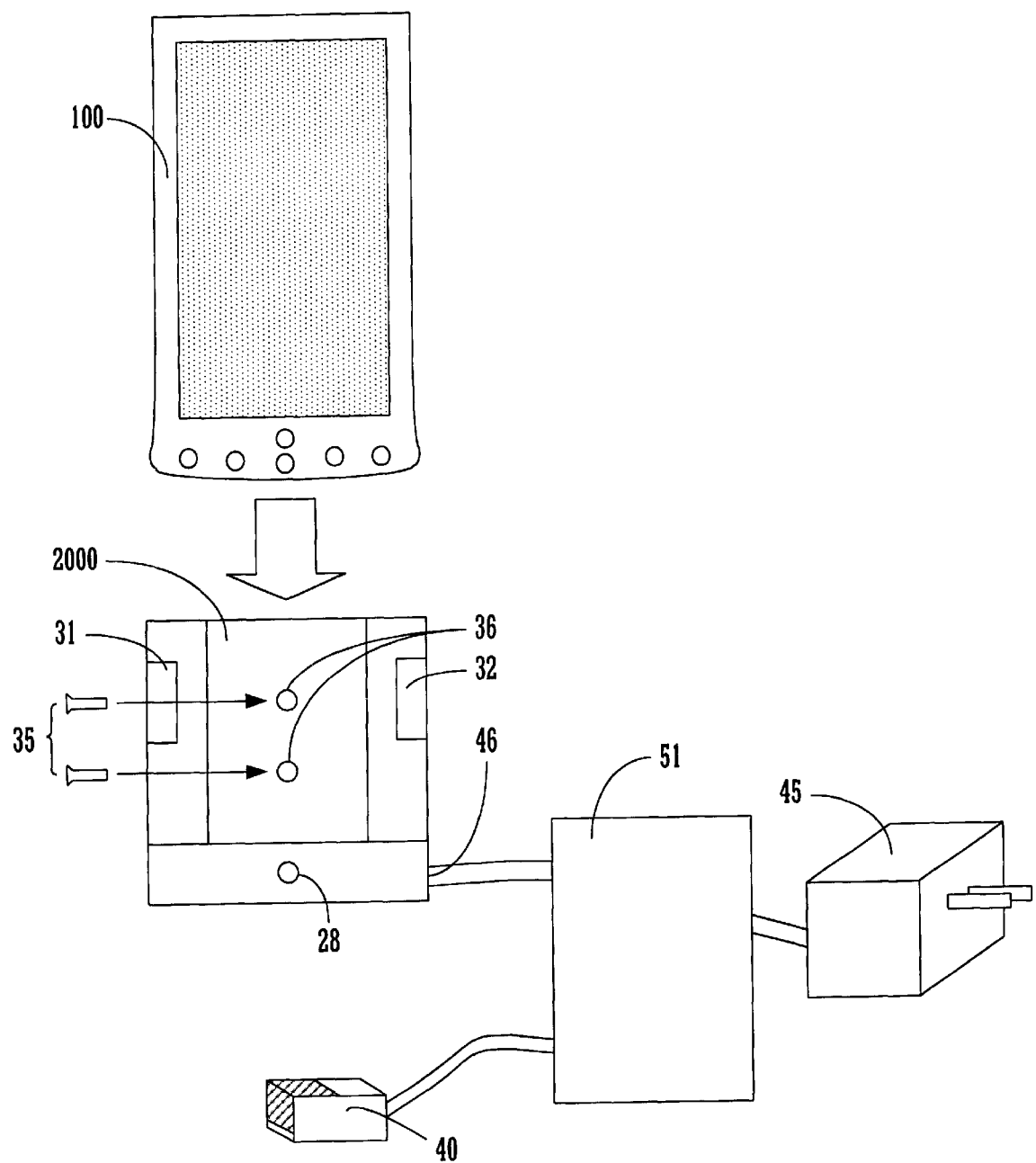
FIG. 15 is a front-view perspective illustration of a palmtop computer cradling unit depicted as coupled to an external modem which is coupled to an AC power cord which is coupled to a RJ-11 telephone cord in accordance with one embodiment of the present invention.

Now with reference to FIG. 15, a front-view perspective illustration of PCCU 2000, one embodiment of the present invention, and as described in FIG. 6, is shown. PCCU 2000 is to have coupled to it PDA 100, in accordance with the present invention. PCCU 2000 is configured to be operated with AC power, which is supplied by AC power adapter 45 which, inserted into phone/power input jack 46, is also coupled to and supplies AC power to external modem 51, which will be plugged into an available AC wall plug. PCCU 2000 is also configured to utilize the RJ-11 telephone jack 40 which is coupled to external modem 51, enabling a dial-up connection to a network, remote computer system, or to the Internet for the downloading of e-mail or web clippings such as weather, sports, stocks, news, and the like.

Figure 16:
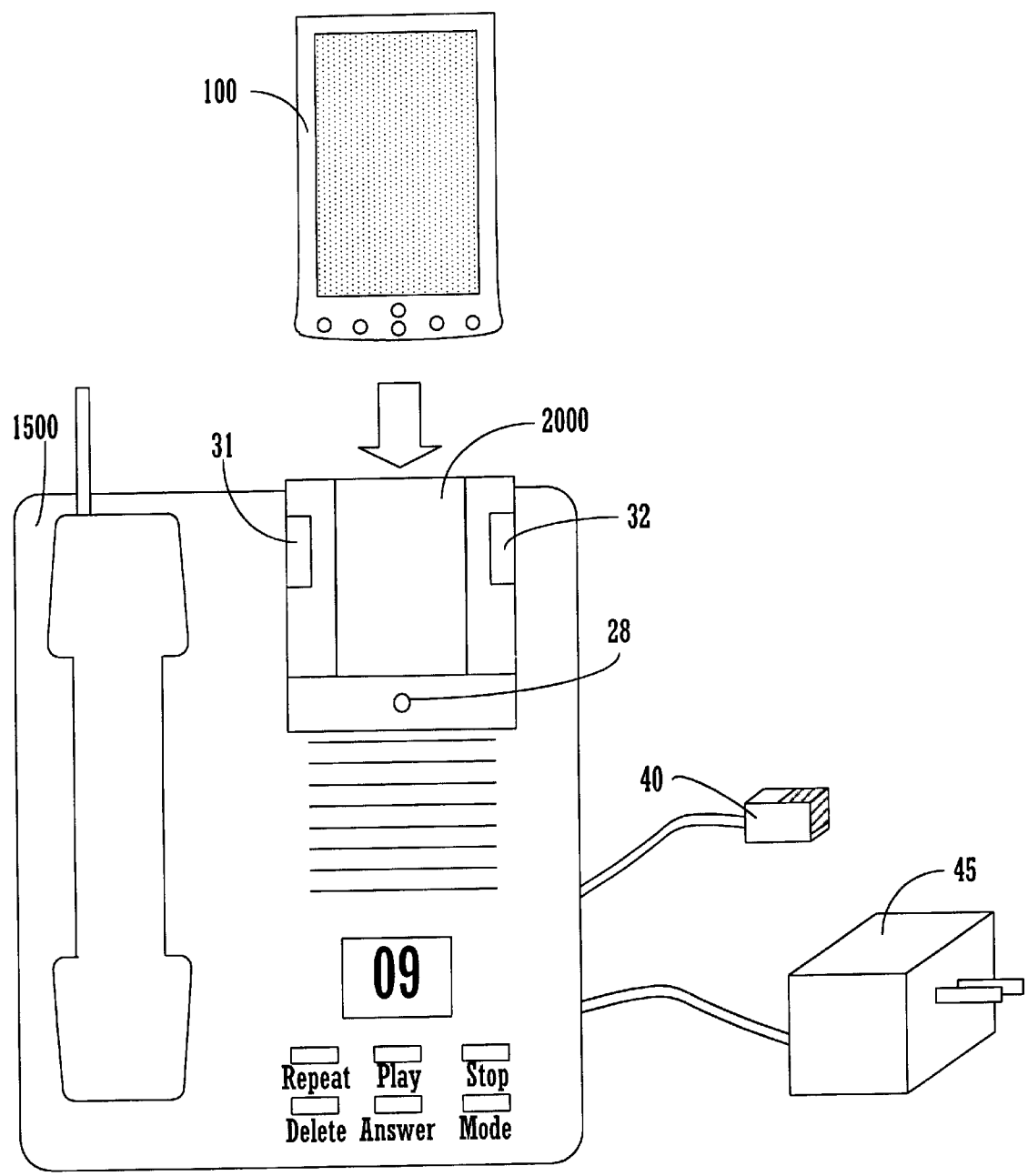
FIG. 16 is a front-view perspective illustration of a palmtop computer cradling unit depicted as integral to the form factor of a complete telephone unit in accordance with one embodiment of the present invention.

Referring now to FIG. 16, a front-view perspective illustration of PCCU 2000, one embodiment of the present invention. Shown is telephone 1500 with an internal modem (not pictured) and a PCCU 2000 integrated into the form factor of the telephone. PDA 100 slides into PCCU 2000 and provides the user with access to PDA 100's buttons and visual display screen. The modem inside telephone 1500 utilizes the same RJ-11 telephone jack 40 as telephone 1500. PDA 100 would access this modem through PCCU 2000. Though internal of telephone 1500, but external of the form factor of the PCCU 2000, this modem is utilized as before, to enable a connection to a network, remote computer system or to the Internet for the downloading of e-mail or web clippings such as weather, sports, stocks, news, and the like. One advantage to telephone 1500, with PCCU 2000 as part of the form factor and with an internal modem (not shown), is a reduction in the number of RJ-11 telephone jacks and AC power adapter plugs needed for the enablement of PCCU 2000, one embodiment of the present invention.

Figure 17:
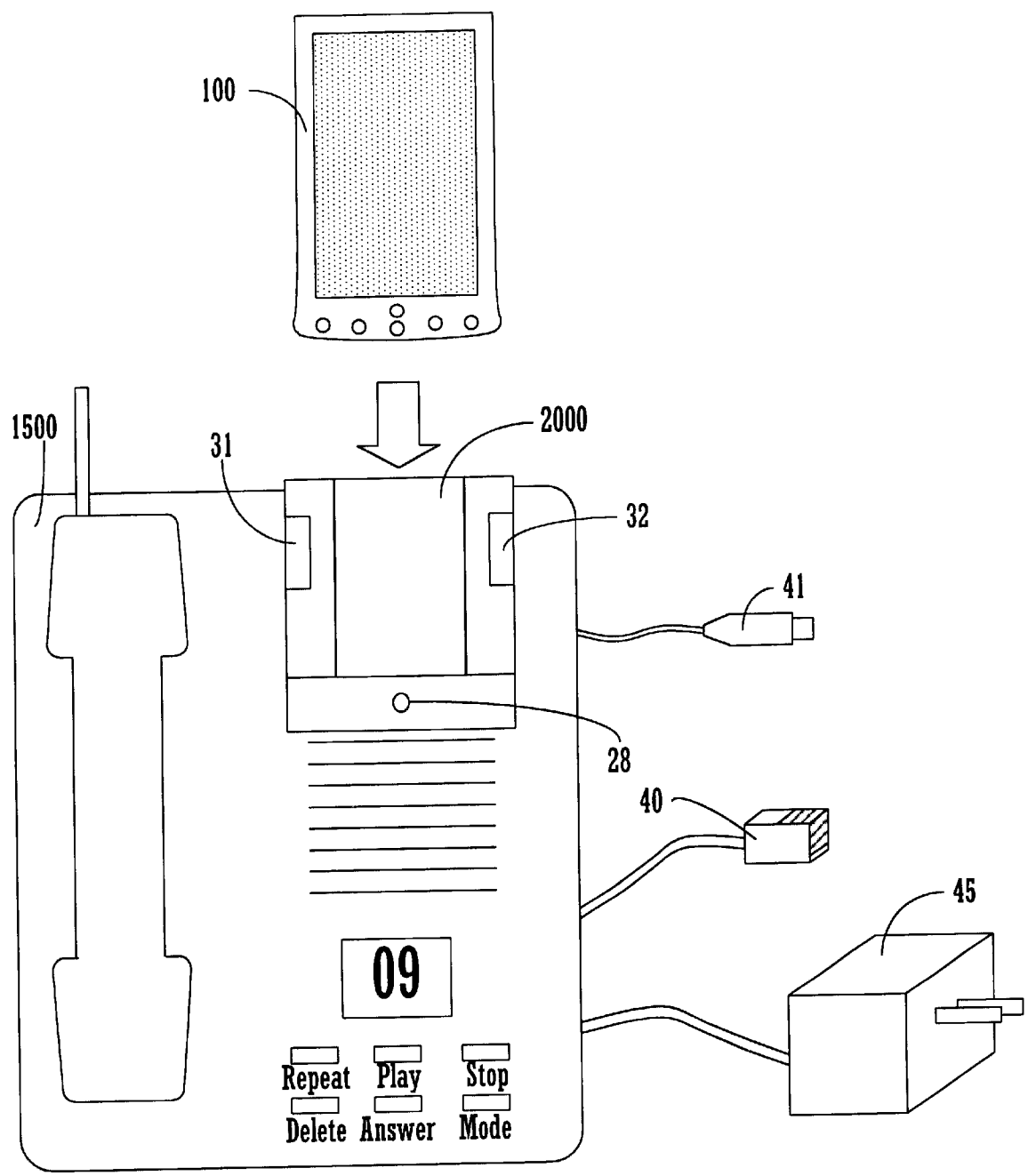
FIG. 17 is a front-view perspective illustration of a palmtop computer cradling unit depicted as integral to the form factor of a complete telephone unit which is coupled to a USB adapter, a RJ-11 telephone cord, and an AC power adapter in accordance with one embodiment of the present invention.
Figure 18:
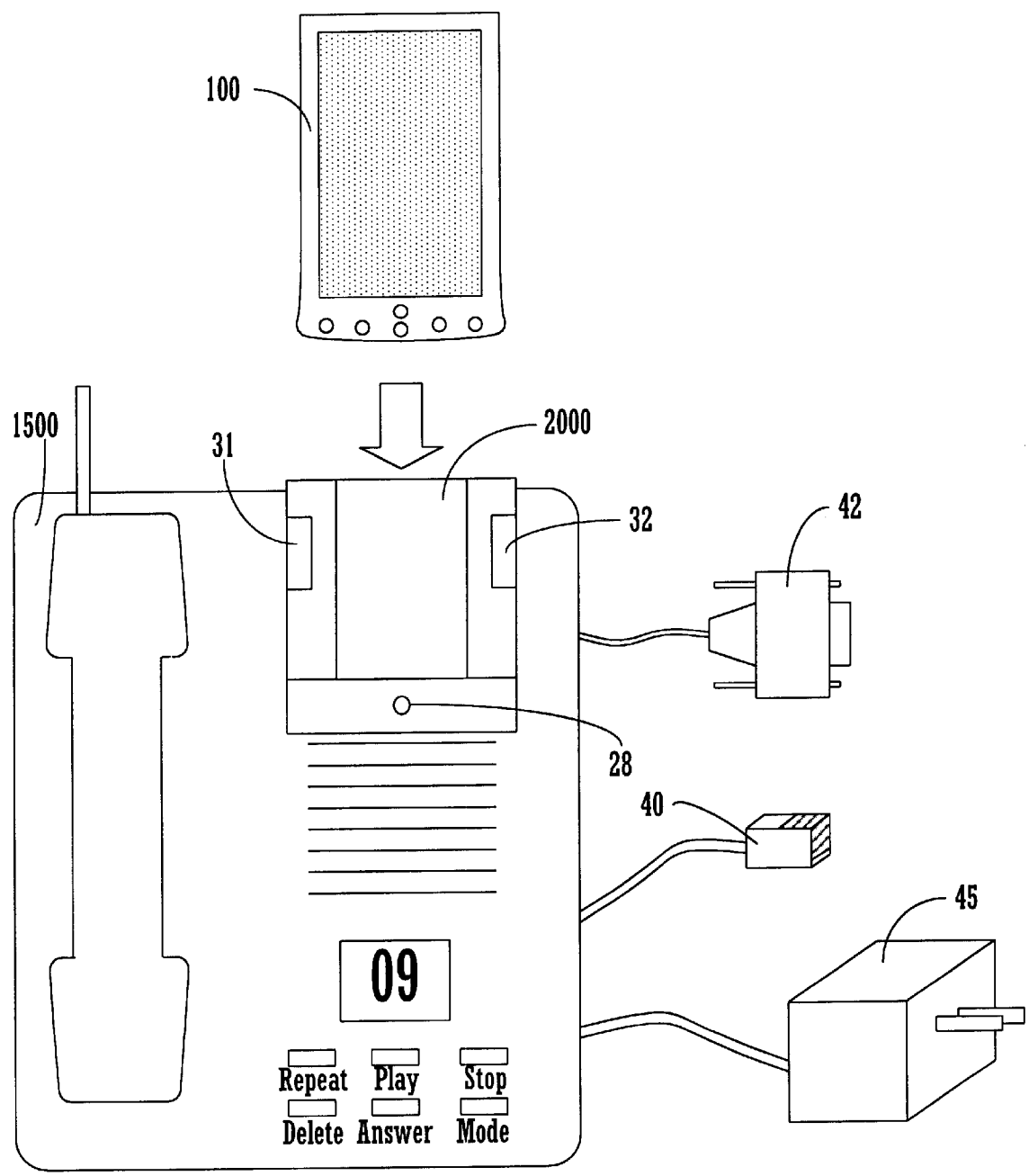
FIG. 18 is a front-view perspective illustration of a palmtop computer cradling unit depicted as integral to the form factor of a complete telephone unit which is coupled to a RS-232 (serial) adapter, a RJ-11 telephone cord adapter, and an AC power cord in accordance with one embodiment of the present invention.

Now referring to FIG. 17, a front-view perspective illustration of palmtop computer cradling unit (PCCU) 2000, one embodiment of the present invention. Shown is telephone 1500, which is analogous to the embodiments of PCCU 2000 as described in the previous paragraph referring to FIG. 16, with one exception. Shown as coupled to telephone 1500 in FIG. 17 is USB connector 41, which enables telephone 1500, with PDA 100 coupled to PCCU 2000, to be directly coupled to a PC, Mac, or any peripheral device, such as a printer that is configured to support and interact with USB technology. Referring now to FIG. 18, the only difference in this illustration from the illustration in FIG. 17 is that in lieu of USB connector 41, this embodiment of the present invention is equipped with a RS-232 connector 42, which performs the same function as USB connector 41, allowing the direct coupling of telephone 1500 to a computer system or peripheral device that, in this instance, supports a serial communication interface.

Figure 19:
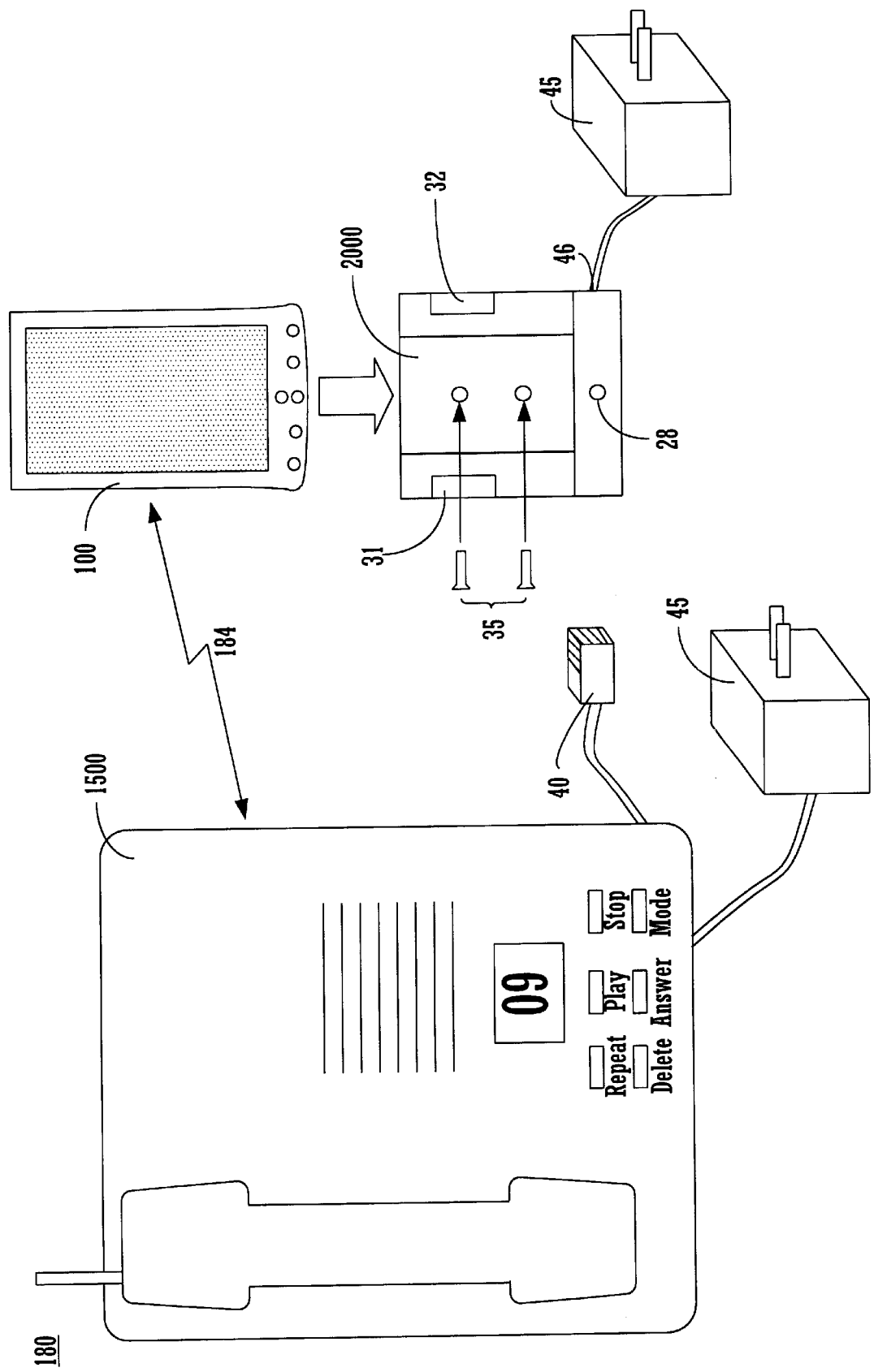
FIG. 19 is a front-view perspective illustration of a palmtop computer cradling unit, depicted as coupled to an AC power cord, in communication with a complete telephone unit, depicted as coupled to a RJ-11 jack and coupled to an AC power cord, in wireless link 184, in accordance with one embodiment of the present invention.

With reference now to FIG. 19, a front-view perspective illustration of PCCU 2000 in wireless environment 180, one embodiment of the present invention, is shown. Referring to the right side of FIG. 19, shown is PCCU 2000 having AC power adapter 45 inserted into phone/power input jack 46 providing the PCCU 2000 with auxiliary AC power, thereby reserving the energy contained within the PDA 100's battery for future use. Shown as to be coupled to PCCU 2000 is PDA 100 which, in this embodiment of the present invention, is equipped with a local wireless connection, and adapted to communicate wirelessly through wireless link 184 to telephone 1500, also equipped with a local wireless connection. Now with reference to the left side of FIG. 19, shown is telephone 1500, equipped with a local wireless connection and an internal modem (not pictured). PCCU 2000, having PDA 100 coupled to it, can then utilize, via wireless link 181, the internal modem contained within telephone 1500 thereby further utilizing RJ-11 telephone jack 40 to enable a dial-up connection to a network, remote computer system or to the Internet for the downloading of e-mail or web clippings such as weather, sports, stocks, news, and the like. As depicted, power to telephone 1500 is provided by coupled AC power adapter 45.

It should be further appreciated that PCCU 2000, as illustrated and described in FIGS. 16, 17, 18, 19, is configured to be wall mounted utilizing the standard telephone wall mounts typically seen in most residences.

Figure 20:
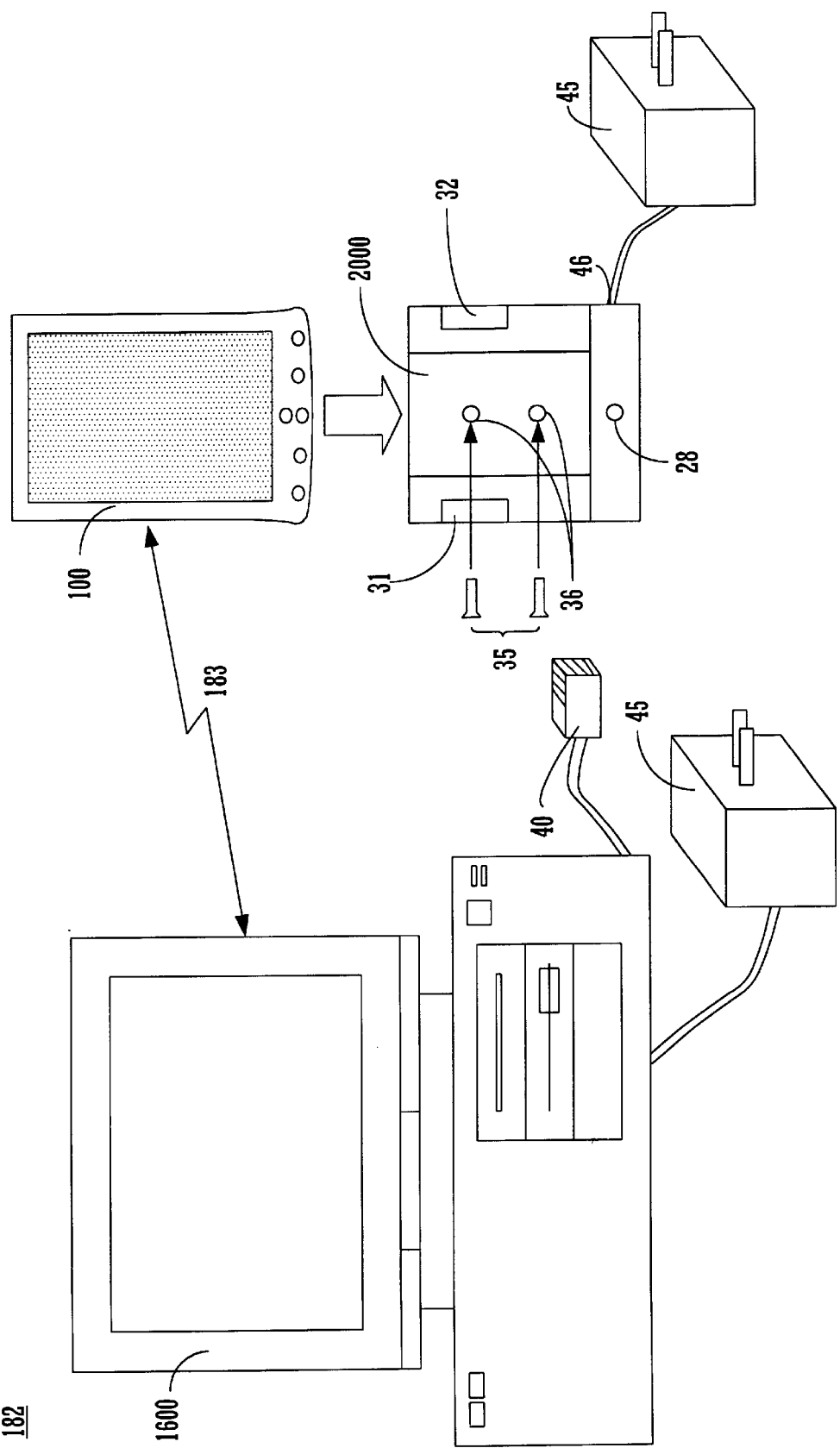
FIG. 20 is front-view perspective illustration of a palmtop computer cradling unit, depicted as coupled to an AC power cord, in communication with a PC computer system, depicted as coupled to a RJ-11 phone jack and also coupled to a AC power cord, in wireless link 183 in accordance with one embodiment of the present invention.

Referring now to FIG. 20, a front-view perspective illustration of PCCU 2000 in wireless environment 182, one embodiment of the present invention, is shown. Referring to the right side of FIG. 20, shown is PCCU 2000 having AC power adapter 45 inserted into phone/power input jack 46 providing the PCCU 2000 with auxiliary AC power, thereby reserving the energy contained within the PDA 100's battery for future use. Shown as to be coupled to PCCU 2000 is PDA 100 which, in this embodiment of the present invention, is equipped with a local wireless connection, and adapted to communicate wirelessly through wireless link 183 to desktop computer system 1600, also equipped with a local wireless connection. Now with reference to the left side of FIG. 20, shown is desktop computer system 1600, equipped with a local wireless connection and an internal modem (not pictured). PCCU 2000, having PDA 100 coupled to it, can then utilize, via wireless link 182, the internal modem contained within desktop computer system 1600, thereby further utilizing RJ-11 telephone jack 40 to enable a dial-up connection to a network, remote computer system or to the Internet for the downloading of e-mail or web clippings such as weather, sports, stocks, news, and the like. As depicted, power to desktop computer system 1600 is provided by coupled AC power adapter 45.

It should be appreciated that while AC power adapter 45 is depicted as supplying auxiliary AC power to both PCCU 2000 and removable modem cradle 52, it may also be configured with a battery recharger, adapted to provide recharging capabilities to the PCCU 2000, thereby replacing the used energy contained within PDA 100's batteries.

Figure 21:
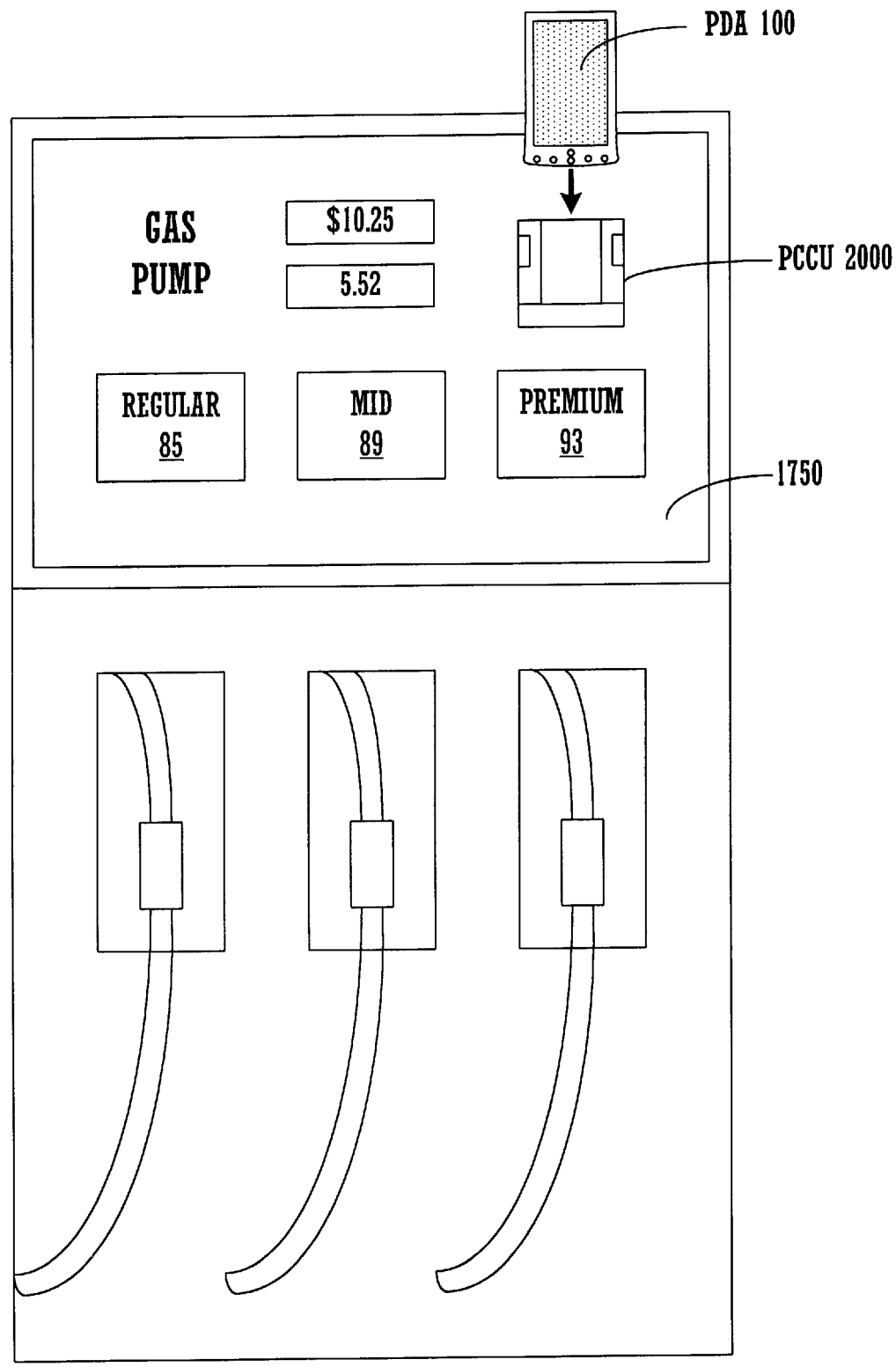
FIG. 21 is a front-view perspective illustration of a palmtop computer cradling unit, depicted as operating within fuel dispensing environment 1700, in accordance with one embodiment of the present invention.

Referring now to FIG. 21, a front-view perspective illustration of PCCU 2000 operating within fuel dispensing environment 1700, one embodiment of the present invention, is shown. PCCU 2000 is depicted as being disposed upon the facial surface of and integral to the form factor of fuel dispensing apparatus 1750. PCCU 2000, as depicted in this embodiment of the present invention, is analogous in form and function to the PCCU 2000 as described in FIGS. 6A–6D. Fuel dispensing apparatus 1750, being internally powered, is adapted to provide power to PCCU 2000. A user would insert their PDA 100 into PCCU 2000 where it would function similarly to the systems now available on gas pumps that accept credit or debit card use. In one instance, the user's banking account information is stored, not on a card, but, within PDA 100 which, when coupled to the PCCU 2000, would charge the purchase to the user's account as if it was a credit card or would deduct it from their account as if it was a debit card. In another instance, the amount of the purchase is recorded in PDA 100 and then added/subtracted from the account balance in, for example, the checkbook software contained therein.

It should be further appreciated that while PCCU 2000, one embodiment of the present invention has been depicted as mounted on the surface of a wall, the cradle may be mounted and implemented in a variety of alternative environments, such as the environment described and depicted in FIG. 21. For example, PCCU 2000 could further be utilized at a retail store, a grocery store, a movie theater, a airline ticket counter, or at an ATM (money machine). In one instance, the user's banking account information is stored, not on a debit or credit card, but, within PDA 100 which, when coupled to the PCCU 2000, would charge the purchase to the user's credit card account or would deduct it from their checking or savings account as if it was a debit card. In another instance, the amount of the purchase is recorded in PDA 100 and then added/subtracted from the account balance in, for example, the checkbook software contained therein. Other implementations could include PCCU 2000 being equipped in police patrol cars. The police officer may take your PDA, plug it into the PCCU 2000 mounted in the police car, read your ID, download all of your information through a wireless modem from the police station, and issue you your citation.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A mountable apparatus adapted to enhance the communication functionalities of a palmtop computer, said mountable apparatus comprising:
   a) a palmtop computer cradling unit, said palmtop computer cradling unit adapted to provide electrical and mechanical coupling to a palmtop computer;
   b) wherein said palmtop computer cradling unit comprises a surface mounting portion adapted to provide mounting functionality to said palmtop computer cradling unit, said surface mounting portion configured to be mounted upon a substantially vertical surface; and
   c) a communication interface connector coupled to said palmtop computer cradling unit, said communication interface connector adapted to provide communication functionalities for a palmtop computer, coupled to said palmtop computer cradling unit.

2. The apparatus of claim 1 wherein said palmtop computer cradling unit further comprises a mechanical slot adapted to receive said palmtop computer.

3. The apparatus of claim 1 wherein said slot of said palmtop computer cradling unit is further adapted to provide passive retention of said palmtop computer.

4. The apparatus of claim 1 wherein said palmtop computer cradling unit further comprises a latching mechanism adapted to retain said palmtop computer.

5. The apparatus of claim 4 wherein said palmtop computer cradling unit further comprises a latching mechanism releasing button adapted to release said latch enabling the removing of said palmtop computer from said palmtop computer cradling unit.

6. The apparatus of claim 1 wherein said surface mounting portion of said palmtop computer cradling unit is adapted to enable mounting of said palmtop computer cradling unit to said substantially vertical surface.

7. The apparatus of claim 1 wherein said surface mounting portion comprises an opening adapted to receive a mechanical retentive device, said opening, through which said mechanical retentive device is inserted, enabling said palmtop computer cradling unit to be mounted on said substantially vertical surface.

8. The apparatus of claim 1 wherein said surface mounting portion comprises a magnetic coupling agent adapted to enable said palmtop computer cradling unit to be magnetically attached to said substantially vertical surface.

9. The apparatus of claim 8 wherein said substantially vertical surface, onto which said palmtop computer cradling unit is to be mounted comprises a magnetically compatible composition adapted to enable said magnetic coupling agent of said palmtop computer cradling unit.

10. The apparatus of claim 1 wherein said communication interface connector of said palmtop computer cradling unit comprises a modem adapted to transmit and receive information.

11. The apparatus of claim 10 wherein said modem of said palmtop computer cradling unit is externally coupled to said palmtop computer cradling unit.

12. The apparatus of claim 10 wherein said modem of said palmtop computer cradling unit is internally coupled to said palmtop computer cradling unit.

13. The apparatus of claim 10 wherein said modem is further adapted to be removably coupled to said palmtop computer cradling unit.

14. The apparatus of claim 13 wherein said palmtop computer cradling unit is further adapted to receive said removably coupled modem.

15. The apparatus of claim 13 wherein said removably coupled modem of said palmtop computer cradling unit is adapted to receive said palmtop computer.

16. The apparatus of claim 13 wherein said removably coupled modem is adapted to be mechanically and electrically coupled to said palmtop computer cradling unit.

17. The apparatus of claim 13 wherein said removably coupled modem is adapted to be mechanically and electrically coupled to said palmtop computer.

18. The apparatus of claim 13 wherein said palmtop computer cradling unit further comprises a latching mechanism adapted to retain said removably coupled modem, provided said removably coupled modem has been received by said palmtop computer cradling unit.

19. The apparatus of claim 13 wherein said removably coupled modem further comprises a latching mechanism adapted to retain said palmtop computer, provided said palmtop computer has been received by said palmtop computer cradling unit.

20. The apparatus of claim 13 wherein said palmtop computer cradling unit further comprises a latching mechanism adapted to retain said palmtop computer, provided said palmtop computer has been received by said palmtop computer cradling unit.

21. A mountable apparatus adapted to enhance the mounting and communicating functionalities of a palmtop computer, said apparatus comprising:

a) a palmtop computer cradling portion adapted to provide electrical and mechanical coupling to a palmtop computer;

b) a telephone system coupled to said palmtop computer cradling portion, said telephone system adapted to provide telephone functionality to a user, said telephone system adapted to be mounted to a substantially vertical surface; and c) a computer interface coupled to said telephone system, said computer interface adapted to provide enhanced communication functionalities for a palmtop computer.

22. The apparatus of claim 21 wherein said palmtop computer cradling portion is further adapted to receive said palmtop computer.

23. The apparatus of claim 21 wherein said palmtop computer cradling portion is further adapted to provide passive retention of said palmtop computer.

24. A cradle system comprising:

a mounting for receiving and retaining a palmtop computer system, said mounting adapted for surface mounting and comprising a connector for making electrical contact with said palmtop computer system, wherein the surface upon which said mounting is mounted is a substantially vertical surface; and a communication interface coupled to said connector for providing a communication mechanism for said palmtop computer system.

25. A cradle system as described in claim 24 wherein said communication interface is compatible with a telephone jack.

26. A cradle system as described in claim 24 wherein said communication interface is compatible with a serial communication interface for a desktop computer system.

27. A cradle system as described in claim 24 wherein said communication interface is compatible with a serial communication interface for a modem.

28. A cradle system as described in claim 24 and further comprising a modem coupled to said communication interface.

29. A cradle system as described in claim 24 wherein said mounting comprises a mechanical slot for receiving said palmtop computer system.

30. A cradle system as described in claim 24 wherein said connector is disposed within said mechanical slot.

31. A cradle system as described in claim 24 wherein said mounting comprises a mechanical rail for receiving said palmtop computer system.

* * * * *